US011383554B2

(12) United States Patent
Giannini et al.

(10) Patent No.: US 11,383,554 B2
(45) Date of Patent: Jul. 12, 2022

(54) ELASTOMERIC MATERIALS FOR COMPONENTS OF TYRES AND TYRES COMPRISING MODIFIED SILICATE FIBRES

(71) Applicant: PIRELLI TYRE S.P.A., Milan (IT)

(72) Inventors: Luca Giannini, Milan (IT); Luciano Tadiello, Milan (IT); Thomas Hanel, Milan (IT); Elkid Cobani, Milan (IT); Barbara Di Credico, Milan (IT); Massimiliano D'Arienzo, Milan (IT); Roberto Scotti, Milan (IT); Franca Morazzoni, Milan (IT); Jorge Jose Perez Cacho, Saragossa (ES); Daniel Javier Julve Sebastian, Saragossa (ES)

(73) Assignee: PIRELLI TYRE S.p.A., Milan (IT)

( * ) Notice: Subject to any disclaimer, the term of this patent is extended or adjusted under 35 U.S.C. 154(b) by 556 days.

(21) Appl. No.: 16/343,669

(22) PCT Filed: Oct. 20, 2017

(86) PCT No.: PCT/IB2017/056540
§ 371 (c)(1),
(2) Date: Apr. 19, 2019

(87) PCT Pub. No.: WO2018/078500
PCT Pub. Date: May 3, 2018

(65) Prior Publication Data
US 2020/0055335 A1 Feb. 20, 2020

(30) Foreign Application Priority Data

Oct. 26, 2016 (IT) .................. 102016000108318

(51) Int. Cl.
*C04B 14/04* (2006.01)
*B60C 1/00* (2006.01)
(Continued)

(52) U.S. Cl.
CPC ........ *B60C 1/0008* (2013.01); *B29D 30/0601* (2013.01); *B60C 11/0302* (2013.01);
(Continued)

(58) Field of Classification Search
CPC .................................................. C04B 14/042
See application file for complete search history.

(56) References Cited

U.S. PATENT DOCUMENTS 4,152,250 A * 5/1979 Inooka ..................... B01J 21/14
208/213
2014/0031455 A1 * 1/2014 Santaren Rome ........ C09C 1/42
106/446

(Continued)

FOREIGN PATENT DOCUMENTS

WO WO 2012/164433 A1 12/2012
WO WO 2016/174629 A1 11/2016

OTHER PUBLICATIONS

International Search Report form the European Patent Office in corresponding International Application No. PCT/IB2017/056540 dated Jan. 4, 2018.

(Continued)

*Primary Examiner* — Timothy Kennedy
*Assistant Examiner* — Alexander A Wang
(74) *Attorney, Agent, or Firm* — Finnegan, Henderson, Farabow, Garrett & Dunner, L.L.P.

(57) ABSTRACT

The present invention relates to new vulcanisable elastomeric compositions for components of tyres, comprising modified silicate fibres as fillers. The silicate fibres are modified according to the process with controlled pH of the invention. In addition, the invention regards components of tyres, comprising elastomeric materials obtainable by vulcanisation of said compositions, and tyres for vehicles comprising one or more of said components. The vulcanised (Continued)

F5 Comp. 5 (Mg -26%)

elastomeric materials according to the invention are characterised by good static and dynamic mechanical properties, in particular by particularly low hysteresis. Advantageously the tyres of the invention comprising one or more of said components have a limited rolling resistance.

10 Claims, 16 Drawing Sheets

(51) Int. Cl.
  *B29D 30/06* (2006.01)
  *B60C 11/03* (2006.01)
  *B60C 15/06* (2006.01)
  *G01N 23/18* (2018.01)

(52) U.S. Cl.
  CPC ........ *B60C 15/0607* (2013.01); *C04B 14/042* (2013.01); *G01N 23/185* (2013.01); *B29D 2030/0655* (2013.01); *B60C 2011/0337* (2013.01); *B60C 2015/061* (2013.01)

(56) References Cited

U.S. PATENT DOCUMENTS

| 2014/0196825 | A1 | 7/2014 | Nahmias Nanni et al. |
| 2015/0165821 | A1 | 6/2015 | Nahmias Nanni et al. |
| 2017/0292013 | A1* | 10/2017 | Blok .......................... C08L 7/00 |

OTHER PUBLICATIONS

Written Opinion of the International Searching Authority from the European Patent Office in corresponding International Application No. PCT/IB2017/056540 dated Jan. 4, 2018.

Hernandez, L., et al. "Preparation of Silica by Acid Dissolution of Sepiolite and Study of its Reinforcing Effect in Elastomers", Die Angewandte Makromolekulare Chemie 103, (1982), pp. 51-60.

Esteban-Cubillo, A., "The role of magnesium on the stability of crystalline sepiolite structure", Journal of the European Ceramic Society, Elsevier Science Publishers, (2008), vol. 28, No. 9, pp. 1763-1768.

* cited by examiner

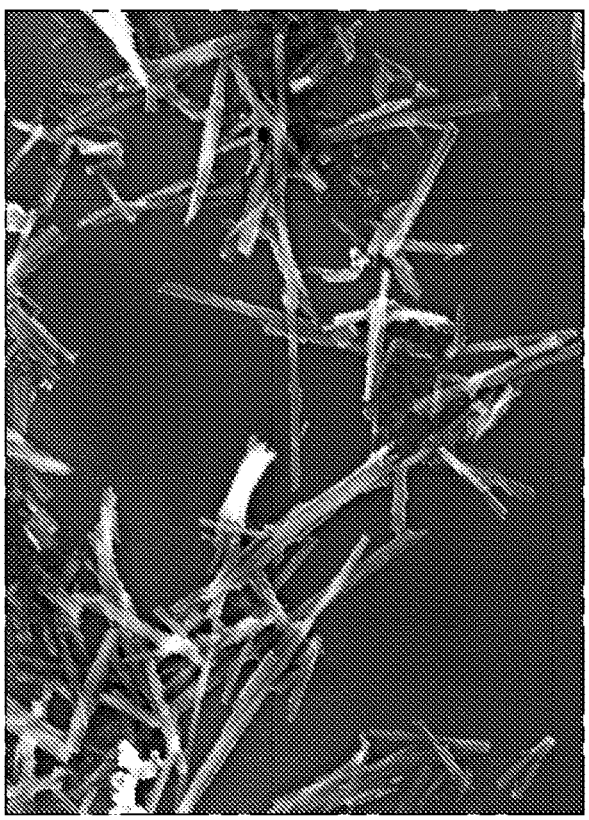
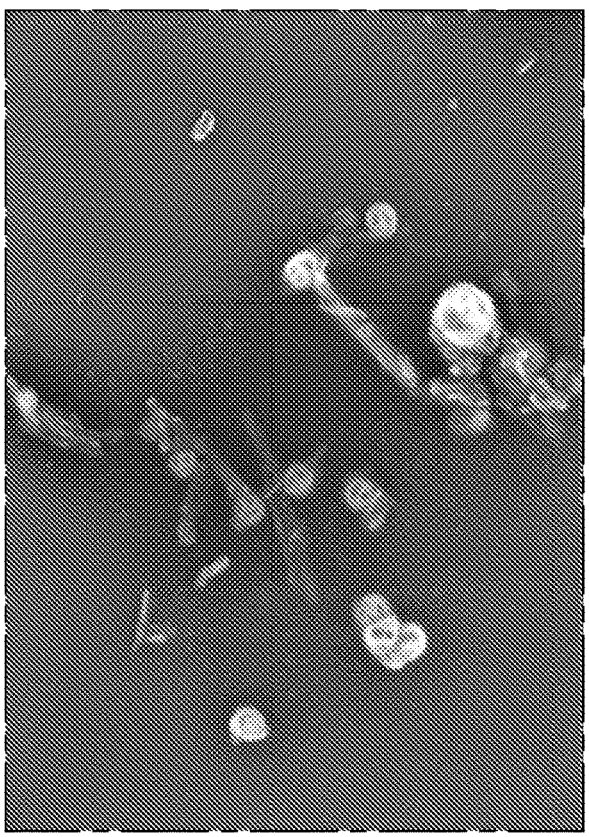
A  
F1 Comp. 1 (Mg -33%)
B  
F2 Comp. 2a (Mg -95%)
FIG.3

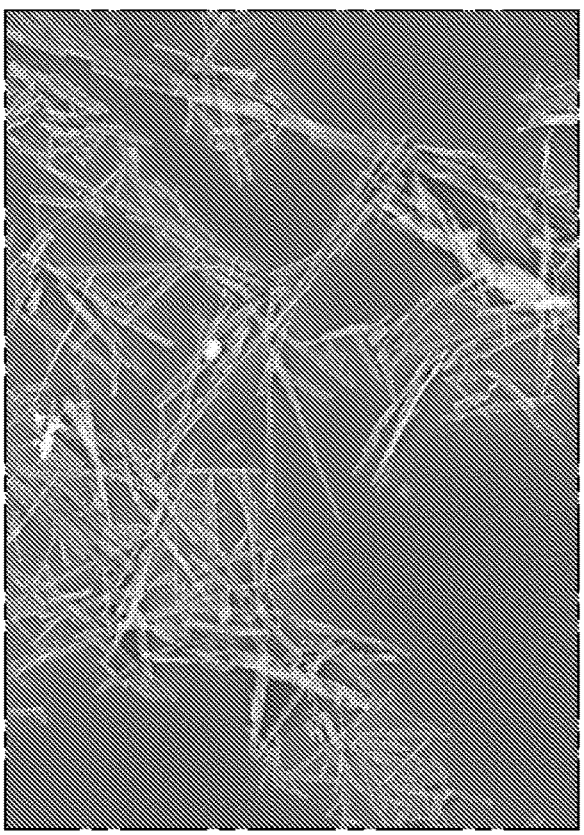
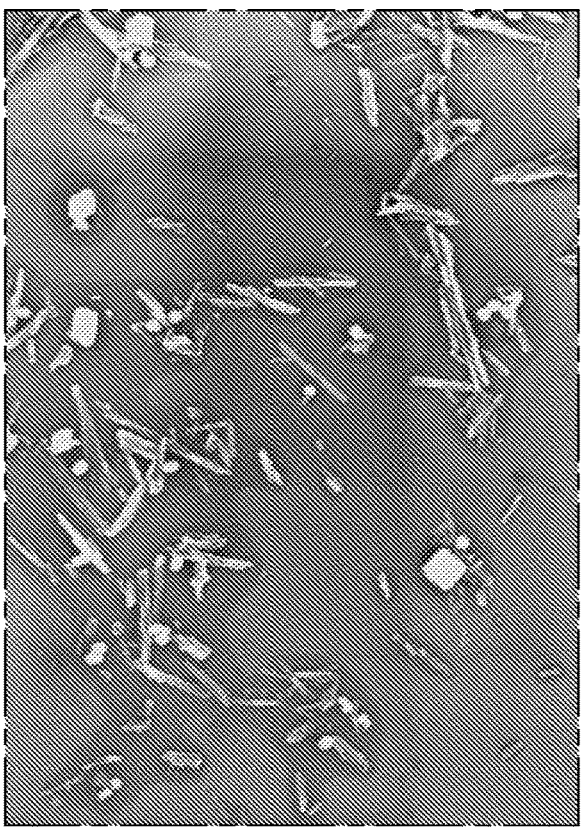
FIG. 4
B: F6 Comp. 6 (Mg -20%)
A: F3 Comp. 3 (Mg -35%)

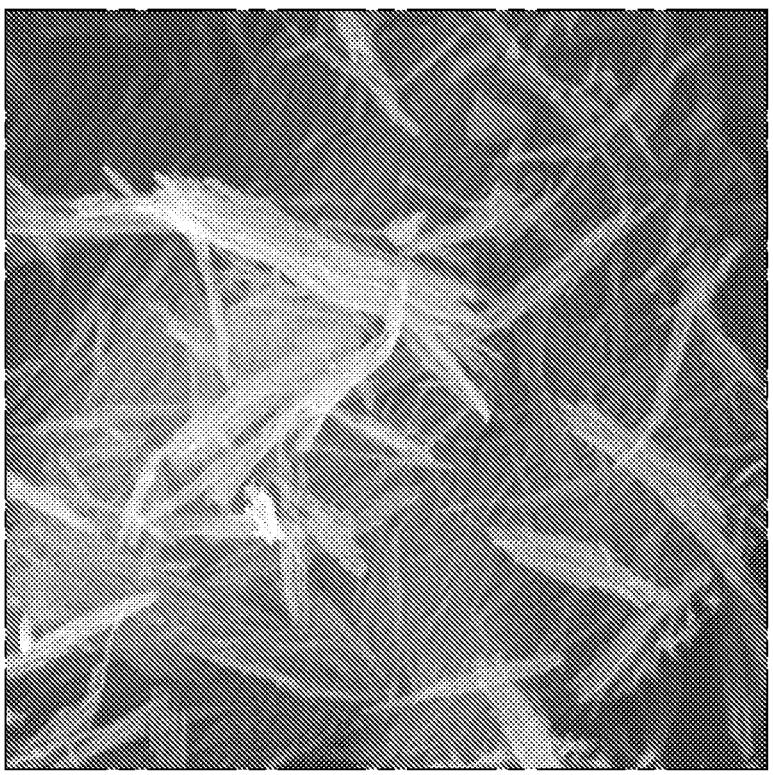
F9 (Mg -34,7%)
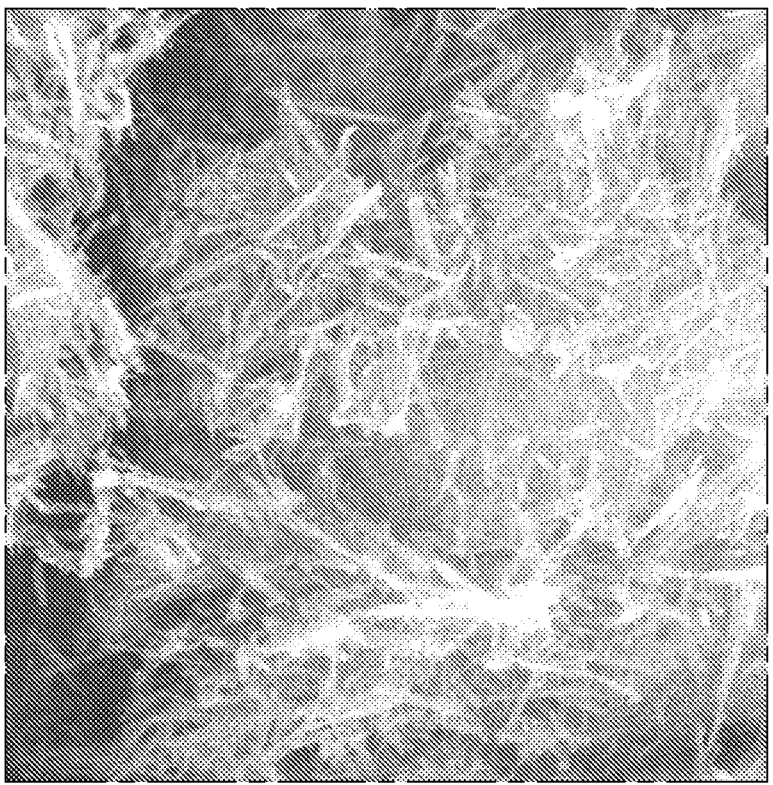
F8 (Mg -33,3%)
SEM
FIG.5

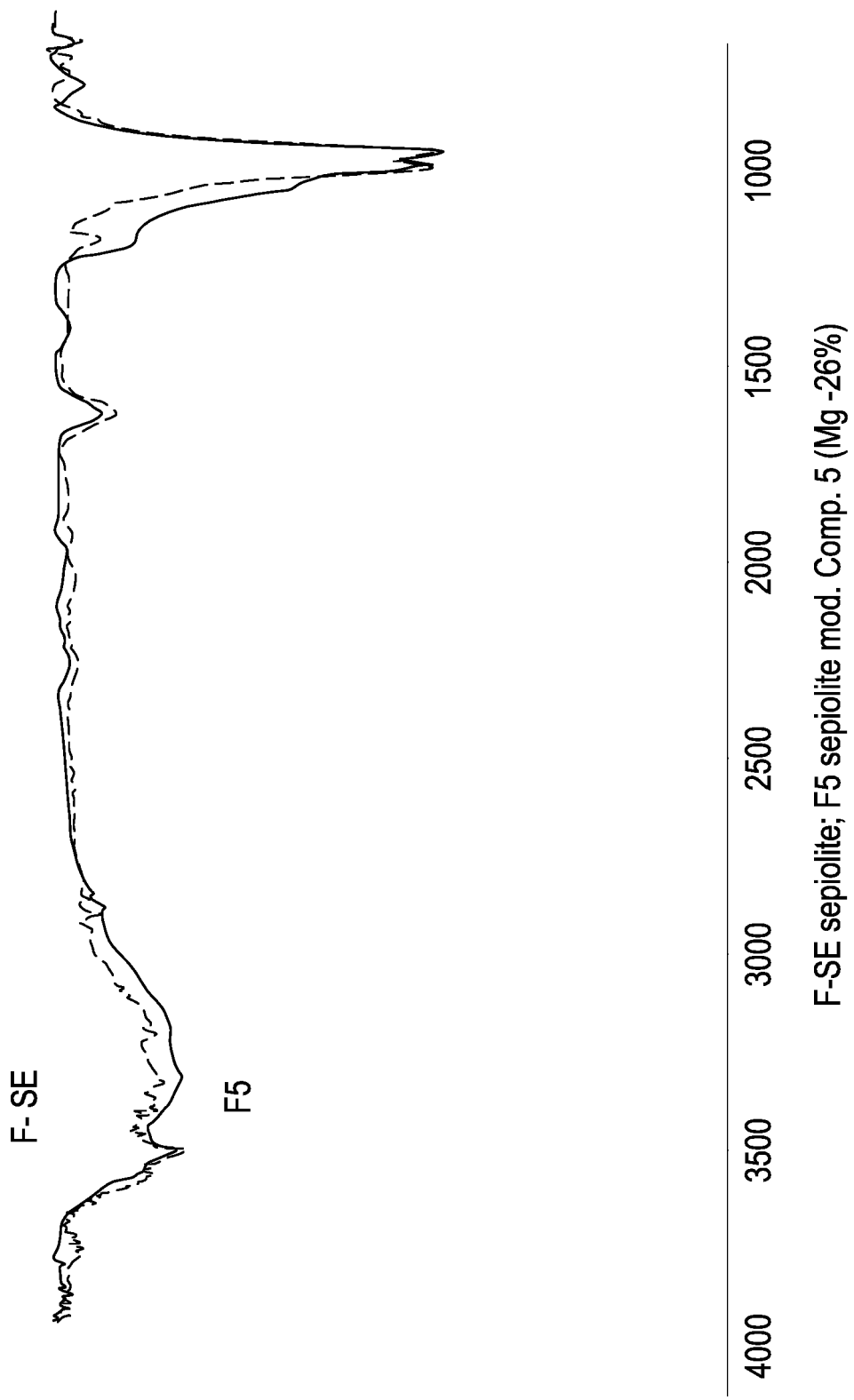

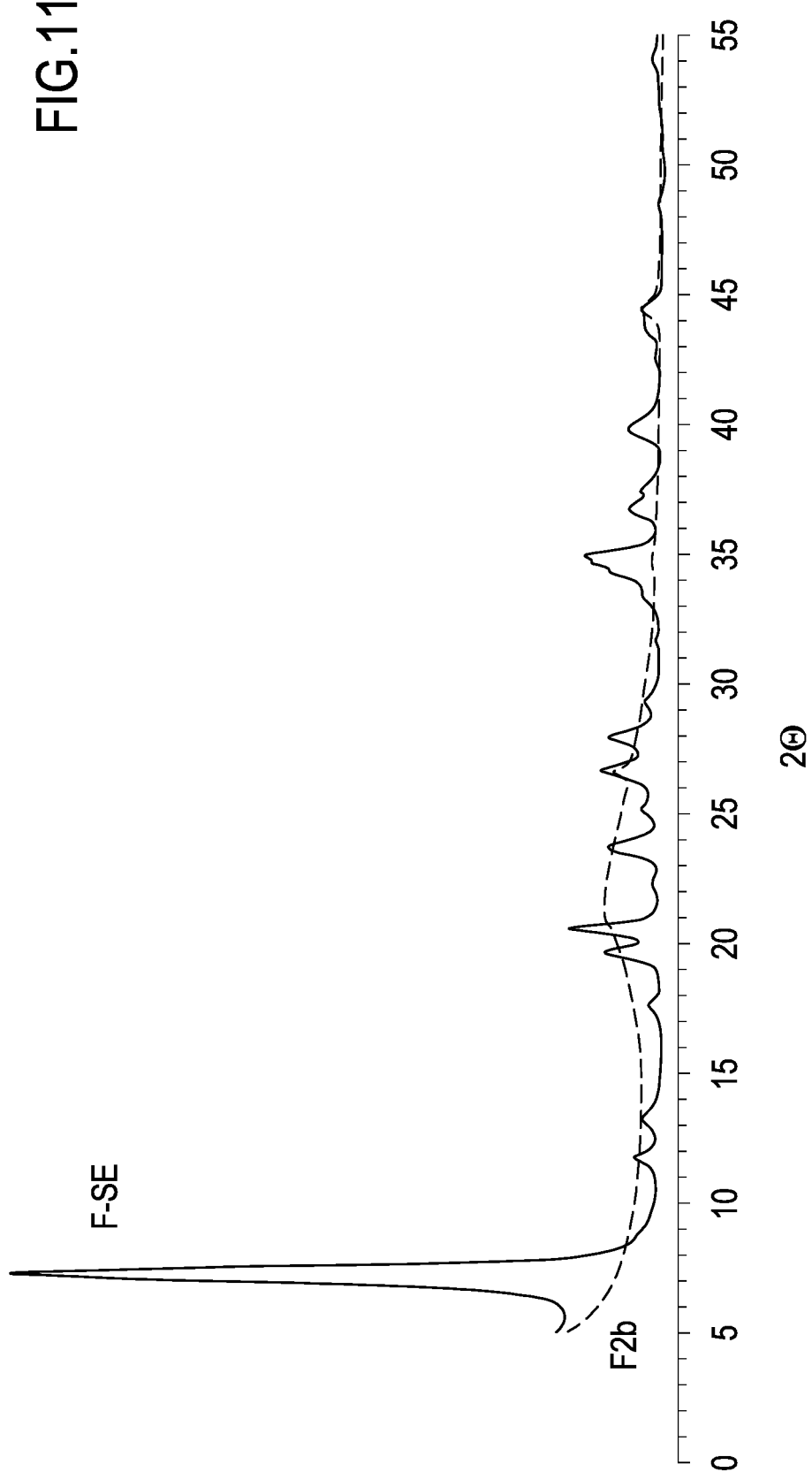

ELASTOMERIC MATERIALS FOR COMPONENTS OF TYRES AND TYRES COMPRISING MODIFIED SILICATE FIBRES

This application is a national stage entry application under 35 U.S.C. § 371 based on International Application No. PCT/IB2017/056540, filed Oct. 20, 2017, and claims priority of Italian Patent Application No. 102016000108318, filed Oct. 26, 2016; the contents of each application is incorporated herein by reference.

FIELD OF THE INVENTION

The object of the present invention is new elastomeric materials for components of tyres, characterised by good static and dynamic mechanical properties, in particular by particularly low hysteresis. These elastomeric materials comprise silicate fibres of nanometric size that are suitably modified according to the process described hereinbelow. In addition, the present invention regards components of tyres and tyres for vehicle wheels comprising said elastomeric materials, such tyres being provided with minor rolling resistance.

STATE OF THE ART

In the rubber industry, and more particularly in the tyre industry, it is known to add reinforcement fillers to the elastomeric compositions for the purpose of improving the mechanical properties and the abrasion resistance of the elastomeric materials obtained thereby by vulcanisation.

Due to its high reinforcing power, carbon black is the most commonly used filler. Nevertheless, it confers a strong hysteresis to the manufactured items, i.e. it increases the heat dissipated in dynamic conditions. In tyres, this translates into the undesired increase of the rolling resistance, and overall into more fuel consumption, a higher production of pollutant emissions and higher transportation costs. Currently, most vehicle manufacturers increasingly request their suppliers to develop tyres with low rolling resistance in order to reduce consumptions.

In order to decrease the hysteresis of the elastomeric materials, it does not help to use limited quantities of carbon black and/or a carbon black with limited surface area, since in such a manner the reinforcement activity is compromised, with a worsening of the final static mechanical properties and abrasion resistance of the product.

An improvement in such sense has been obtained with the use of the so-called "white" reinforcement fillers, such as gypsum, talc, kaolin, bentonite, titanium dioxide, and above all silica, fillers which can partially or completely substitute the carbon black in the elastomeric materials and confer a smaller hysteresis thereto while maintaining a sufficient reinforcement.

Nevertheless, there is still the need to further reduce the rolling resistance of the tyres and hence to identify new fillers which allow a further improvement of the balance between hysteresis and reinforcement of the materials.

Indeed, the hysteresis of the elastomeric materials filled with silica still remains too high for certain specific applications, for example in tyres with ultra low rolling resistance (ULRR) or in run-flat tyres in which decidedly lower heat dispersion and rolling resistance are instead required. The elastomeric materials filled with silica and/or silicates have not always proven to have sufficient performances when incorporated in those components of the tyre that are more greatly stressed, such as the tread, the under-layer, the bead protection layer, the sidewall, the internal layers or the sidewall insert, for example the insert in the sidewall of a self-supporting tyre type (run-flat).

In addition, one problem of the fillers in general, more particularly of the silica, is represented by the fact that in dynamic conditions, i.e. when the elastomeric material filled with silica and vulcanised is stressed in the tyre during use, a partial disaggregation of the dispersed filler can be verified which negatively affects the mechanical properties. This phenomenon is manifested with a reduction of the dynamic modulus that is much more marked the higher the deformation to which the elastomeric material is subjected. In practical terms, precisely when the tyre is more greatly stressed and hence precisely when the elastomeric material must have the best mechanical performances, the reinforcement effect of the filler is less effective. This phenomenon is known as the Payne effect. Fillers silicate fibre based, while unexpectedly improving the drivability of cars subjected to high operating speeds and/or extreme driving conditions, would not appear to remedy the drawbacks of the silica in terms of excessive rolling resistance and lower support at the highest deformations.

On such matter, the document WO2012164433A1 in the name of the Applicant, describes tyres which have improved performances during use in extreme conditions, in particular an improved driving stability, especially at the rear part of the vehicle. In these tyres, at least one layer of an elastomeric materials is applied, in radially internal position with respect to the tread band; such at least one layer of an elastomeric material comprises fibres of nanometric size constituted by magnesium and/or aluminium silicates, in particular sepiolite. The elastomeric material, which is considerably reinforced by the sepiolite fibres, nevertheless has a decrease of the dynamic shear modulus with the increase of the dynamic deformation (Payne effect) and a greater hysteresis with respect to the material filled with silica.

Known from the literature are several general studies that describe processes of acid treatment of silicate fibres, in particular of sepiolite. In accordance with the more or less drastic applied conditions, such treatments can lead to the complete removal of the ions inserted between the silicates and to the conversion of the silicates into destructured amorphous silica (SilSep), or to the partial moving away of the ions and conversion of the silicates into silica only at the surface, with preservation of the needle-shaped morphology of the fibres.

For example, the article "*Novel anhydrous unfolded structure by heating of acid pre-treated sepiolite*", Valentin, J. L., et al. Applied Clay Science, 2007, 36(4), 245-255 and the article "*The role of magnesium on the stability of crystalline sepiolite structure*" Esteban-Cubillo, A. et al., Journal of the European Ceramic Society, 2008, 28(9), 1763-1768, describe the effects of the partial or total removal of magnesium on the morphology of the sepiolite.

According to the Applicant, there are no suggestions in the state of the art to advantageously use, as additional fillers of elastomeric materials for tyres, needle-shaped silicate fibres that are acid-modified in mild conditions and with only partial removal of the magnesium.

Indeed, the article "*Effect of the Textural Characteristics of the New Silicas on the Dynamic Properties of Styrene-Butadiene Rubber (SBR) Vulcanizates*" Polymer Composites, (June 1988), vol. 9, No. 3, 204-208, describes a study in which sepiolite fibres, subjected to treatments with concentrated acid (6N nitric acid) to give silicas with different surface area, are incorporated in elastomeric materials and then evaluated in terms of dynamic properties. The article does not suggest the partial removal of the magnesium nor the maintenance of the needle-shaped form of the treated fibre.

In the article "*Preparation of Silica by Acid Dissolution of sepiolite and Study of its reinforcing effect in Elastomers*", Die Angewandte Makrom Chemie (1982), 103, 51-60, the authors describe the preparation of materials with different magnesium content by treatment of sepiolite fibres with nitric acid, at variable temperatures and times. The study reports the use of sepiolite in elastomeric materials for tyres; such completely extracted sepiolite is described as an amorphous silica with high surface area comprising less than 1% residue Mg, which has completely lost the crystalline order. Such silica obtained via complete extraction of the Mg is presented as a potential low-cost alternative to the commercial precipitated amorphous silica. The article only reports the data of static mechanical properties relative to blends filled with a silica obtained via exhaustive acid treatment.

In the prior art, the magnesium removal reaction is carried out by placing the sepiolite fibres in a suitable solvent, from the start, in contact with the total acid quantity necessary for the extraction. The pH of these suspensions is decidedly acidic, generally much lower than 2, which makes it difficult to use normal steel apparatuses, which are sensitive to acidic corrosion.

In addition, working at relatively high concentrations of acid from the start, the extraction of the magnesium proceeds quickly, making it particularly difficult to interrupt the extraction at a pre-established value.

In conclusion, the pertinent publications relative to the tyre field known to the Applicant teach drastic treatments of the sepiolite fibres—generally with excess concentrated acids or in energetic conditions such to substantially and quickly remove the magnesium, often with alteration of the crystallinity and the morphology of the fibres.

SUMMARY OF THE INVENTION

The Applicant has set the problem of how to further reduce the hysteresis of the current elastomeric materials filled with silica in order to make tyres with minimum rolling resistance (ULRR tyres), usable in particularly difficult conditions or for wider applicability, e.g. in summer, all-season or winter tyres for cars, as well as in light transport tyres or tyres for heavy load vehicles.

The Applicant has also set the objective of minimising that deterioration of the mechanical properties at high deformations typical of the elastomeric materials for tyres filled with silica and/or carbon black, simultaneously maintaining other important performances such as the limited rolling resistance, rigidity, abrasion resistance and, in driving the vehicle, manageability and comfort.

The Applicant has found that silicate fibres of nanometric size—suitably modified according to the process described hereinbelow—confer unexpected properties to the elastomeric materials in which they are incorporated, as a substitution of or in addition to the conventional fillers. These elastomeric materials are characterised not only by high static modulus values, but also by the maintenance of the dynamic modulus at high deformations and by a decreased generation of heat when subjected to stresses, for the reduction of the Payne effect as well as of the hysteresis.

The dynamic properties of the elastomeric materials comprising the present modified fibres are better than those of elastomeric materials of equivalent composition filled with the non-modified fibres (like those described in WO2012164433A1) or with only silica.

The lower hysteresis of the present elastomeric materials is predictive in the tyre of a limited rolling resistance, lower than that of tyres comprising analogous elastomeric materials filled with silica.

In addition, the optimal static mechanical properties of these elastomeric materials, together with the significant diminution of the Payne effect, in the tyre translate into a high reinforcement action that remains even with the highest stresses and in extreme driving conditions.

Without wishing to be constrained to any particular theory, the Applicant deems that the process for treating the silicate fibres in the particularly controlled acidic conditions described herein, in the variants thereof, would only involve a partial removal of magnesium from the fibres with substantial maintenance of the crystillinity and of the needle-shaped morphology.

The present process of partial removal of magnesium would appear to generate an intermediate species between the original silicate fibre, highly structured but poorly compatible with the elastomeric materials, and the amorphous silica with high surface area, completely destructured, obtainable by drastic acid treatment of the fibres (SilSep).

During the subsequent interactions with the other components of the elastomeric material, such as silanes and elastomers, and in general in the vulcanisation of the elastomeric material, it would be this intermediate species to interact with the components. This interaction would benefit from the particular needle-shaped arrangement, actually resulting in elastomeric materials provided with unexpected dynamic properties, in particular with significantly diminished hysteresis and Payne effect.

Such effects are not observed in elastomeric materials comprising precipitated amorphous silica, spheroidal and not needle-shaped, nor are they seen in elastomeric materials comprising non-modified silicate fibres, in which—even if there is optimal needle-shaped morphology—there is no reactivity of the amorphous silica, nor are they seen in elastomeric materials comprising silicate fibres that have been over drastically treated with excess acids, with substantial loss of the crystalline structure and of the needle-shaped morphology, as shown in the state of the art.

The Applicant has found that it is possible to advantageously proceed with the progressive removal of the magnesium from the silicate fibres, without altering the morphology and the crystillinity thereof, adding the provided quantity of acid in small aliquots after the reaction has progressed rather than in a single initial solution, as in the prior art. In practice, instead of having to strictly control the level of removal of the magnesium during the reaction and provide for the timely quenching in order to seek to avoid excessive depletion, the present process simply requires maintaining the pH of the medium within certain limits due to the gradual addition of the acid, without risking the loss of morphology or crystillinity even in the case of prolonged reactions.

It is rather surprising that the present process, in which the reaction medium comprises free acid though always in a rather low amount, is so effective in removing the magnesium, in particular in light of the prior art which instead taught high initial acid concentrations that are not very industrially feasible. Advantageously, the present reaction medium is only mildly acidic and therefore allows the use of apparatuses made of standard steel, with a significant cost reduction.

Therefore, a first aspect of the present invention is constituted by an elastomeric composition for tyre components comprising at least:

(a) 100 phr of at least one diene elastomeric polymer;
(b) from 1 to 80 phr of modified silicate fibres of nanometric size, with substantially preserved needle-shaped morphology, comprising from 3.8% to 12% of magnesium;
(c) from 0 to 120 phr of a standard reinforcement filler, and
(d) from 0 to 20 phr of a coupling agent,
wherein said modified fibres can be obtained according to a process that comprises:
  providing silicate fibres with needle-shaped morphology of nanometric size comprising magnesium,
  suspending said fibres in a liquid medium,
  adding, to the suspension, at least one acid compound bringing the pH of the medium to between 2 and 4,
  allowing the reaction, maintaining the pH of the medium to between 2 and 4, by further addition of acid, up to extracting from 10% to 70% by weight of magnesium from the fibres, substantially preserving their crystalline structure and needle-shaped morphology and
  separating the fibres thus modified from the liquid medium.

A second aspect of the present invention regards a vulcanisable elastomeric composition for tyre components further comprising (e) from 0.1 to 15 phr of a vulcanisation agent.

A third aspect of the present invention regards a tyre component for vehicle wheels comprising a vulcanisable elastomeric composition in accordance with the second aspect of the invention, or at least partially vulcanised, obtainable by at least partial vulcanisation of said vulcanisable elastomeric composition in accordance with the second aspect of the present invention.

A fourth aspect of the present invention regards a tyre for vehicle wheels comprising at least one tyre component in accordance with the third aspect of the present invention.

A fifth aspect of the present invention regards a process for modifying silicate fibres with needle-shaped morphology of nanometric size comprising
  providing silicate fibres with needle-shaped morphology of nanometric size comprising magnesium,
  suspending said fibres in a suitable liquid medium,
  adding, to the suspension, at least one acid compound bringing the pH of the medium to between 2 and 4,
  allowing the reaction, maintaining the pH of the medium to between 2 and 4, by further addition of acid, up to extracting from 10% to 70% by weight of magnesium from the fibres, substantially preserving their crystalline structure and needle-shaped morphology and
  separating the fibres thus modified from the final medium.

For the purpose of the present description and of the following claims, the term "phr" (parts per hundreds of rubber) signifies the parts by weight of a specific component of the vulcanisable elastomeric composition per 100 parts by weight of the diene elastomeric polymer.

Unless otherwise indicated, all the percentages are expressed as percentages by weight.

According to a preferred first aspect, the present invention regards an elastomeric composition for tyre components comprising at least:
(a) 100 phr of at least one diene elastomeric polymer;
(b) from 1 to 80 phr of modified silicate fibres of nanometric size, with substantially preserved needle-shaped morphology, comprising from 3.8% to 12% of magnesium,
(c) from 0 to 120 phr of a standard reinforcement filler, and
(d) from 0 to 20 phr of a coupling agent,
wherein said modified fibres are obtainable according to a process that comprises:
  providing silicate fibres with needle-shaped morphology of nanometric size comprising magnesium ions, wherein said fibres are sepiolite fibres,
  suspending said fibres in a liquid medium,
  adding, to the suspension, at least one acid compound bringing the pH of the medium to between 2 and 4,
  allowing the reaction, maintaining the pH of the medium to between 2 and 4, by further addition of acid, up to extracting from 10% to 70% by weight of magnesium from the fibres, substantially preserving their crystalline structure and needle-shaped morphology and
  separating the fibres thus modified from the final medium.

With the phrase "modified silicate fibres of nanometric size", and the like, silicate fibres of nanometric size are intended which have been modified via partial removal of the magnesium up to a final content thereof comprised between 3.8% and 12%, simultaneously substantially preserving the original needle-shaped morphology and crystalline structure.

The elastomeric composition for tyre components according to the present invention is characterised by one or more of the following preferred aspects taken on their own or in combination with each other. The elastomeric composition for tyre components according to the present invention comprises 100 phr of at least (a) one diene elastomeric polymer.

Preferably, the diene elastomeric polymer (a) which can be used in the present invention can be selected from among those commonly used in elastomeric materials crosslinkable with sulfur, which are particularly suitable for producing tyres, i.e. from elastomeric polymers or copolymers with an unsaturated chain having a glass transition temperature (Tg) generally lower than 20° C., preferably comprised in the interval from 0° C. to −110° C. These polymers or copolymers can be of natural origin or they can be obtained by means of polymerisation in solution, polymerisation in emulsion or polymerisation in gaseous phase of one or more conjugated diolefins, possibly mixed with at least one comonomer selected from among monovinylarenes and/or planar comonomers in a quantity not higher than 60% by weight.

The conjugated diolefins generally contain from 4 to 12, preferably from 4 to 8 carbon atoms and can for example be selected from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof.

1,3-butadiene and isoprene are particularly preferred.

Monovinylarenes, which can possibly be used as comonomers, generally contain from 8 to 20, preferably from 8 to 12 carbon atoms and can be selected for example from: styrene; 1-vinylnaphthalene; 2-vinylnaphthalene; various alkyl, cycloalkyl, aryl, alkylaryl derivatives, or styrene arylalkyl derivatives, such as α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl) styrene, and mixtures thereof. Styrene is particularly preferred.

Polar comonomers, which can possibly be used, can for example be selected from: vinylpyridine, vinylquinoline, acrylic acid esters and alkyl acrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer (a) which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), possibly halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile, and mixtures thereof.

According to a preferred embodiment, said elastomeric composition comprises at least 10% by weight, preferably between 20% by weight and 100% by weight, with respect to the total weight of said at least one diene elastomeric polymer (a), of natural rubber.

The aforesaid elastomeric composition can possibly comprise at least one elastomeric polymer of one or more monoolefins with an olefin comonomer or derivatives thereof (a'). The monoolefins can be selected from: ethylene and α-olefin generally containing from 3 to 12 carbon atoms, such as propylene, 1-butene, 1-pentene, 1-hexene, 1-octene and mixtures thereof. The following are preferred: copolymers from among ethylene and an α-olefin, possibly with a diene; homopolymers of isobutene or copolymers thereof with small quantities of a diene, which are possibly at least partly halogenated. The possibly present diene generally contains from 4 to 20 carbon atoms and it is preferably selected from: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among these, the following are particularly preferred: ethylene/propylene (EPR) copolymers or ethylene/propylene/diene copolymers (EPDM); polyisobutene; butyl rubbers; halo-butyl rubbers, in particular chlorobutyl or bromobutyl rubbers; or mixtures thereof.

A diene elastomeric polymer (a) or an elastomeric polymer (a') functionalised by means of reaction with suitable terminating agents or coupling agents can also be used. In particular, the diene elastomeric polymers obtained by means of anionic polymerisation in the presence of an organometallic initiator (in particular an organolithium initiator) can be functionalised by making the residual organometallic groups derived from the initiator react with terminating agents or coupling agents such as, for example, imines, carbodiimides, alkyl tin halides, substituted benzophenones, alkoxysilanes or aryloxysilanes.

The present elastomeric composition comprises (b) modified silicate fibres with needle-shaped morphology of nanometric size.

In the present description, with the term "fibre with needle-shaped morphology" it is intended an elongated element having one dimension (length) much greater than the diameter or the maximum size of the cross section.

In particular, it is intended that said fibres have a ratio between the greater dimension (length) and the diameter or maximum dimension of the cross section (aspect ratio) of at least 2:1, preferably of at least 3:1, more preferably of at least 5:1.

Preferably the fibres have an aspect ratio not higher than 1000:1, more preferably not higher than 100:1.

Preferably said ratio is evaluated via microscopic observation, preferably conducted on at least one hundred fibres.

Preferably at least 70%, 80%, 90% of the fibres have the aforesaid aspect ratio.

With the expression "nanometric size" referred to the fibres it is intended that the fibres have a diameter or maximum size of the cross section lower than 500 nm.

Preferably, said fibres have a diameter or a maximum size of the cross section comprised between 1 and 100 nm, more preferably between 5 and 50 nm, still more preferably between 15 and 20 nm. Preferably, said fibres have a length lower than 10 µm, more preferably comprised between 0.1 and 10 µm, still more preferably between 0.1 and 5 µm.

Preferably, said modified silicate fibres of nanometric size substantially preserve the crystalline structure.

With the phrase "substantially preserving the crystalline structure" and the like it is intended to indicate that at the end of the process described herein the modified fibres preserve most of the crystalline structure, in accordance with that shown by the bands of the most intense signals of the spectrum IR (FIGS. 9B and 10B) in the interval 850–1040 $cm^{-1}$ (crystalline sepiolite) with respect to those in the interval 1040-1300 $cm^{-1}$ (amorphous silica) of the spectrum IR.

In particular, in the present context the crystalline structure of the fibres is deemed substantially preserved if, after the treatment, the ratio between the area under the curve of the spectrum IR in the interval 850-1040 $cm^{-1}$ and the area under the curve in the interval 1040-1300 $cm^{-1}$ is higher than 0.8, preferably higher than 1, more preferably higher than 1.25.

With the phrase "substantially preserving their needle-shaped morphology" it is intended to indicate that at the end of the process described herein at least 50%, 60%, 70% 80%, 90% of the modified fibres maintain their aspect ratio as previously defined.

The silicate fibres with needle-shaped morphology which are subjected to controlled acid treatment as described herein, are silicate fibres comprising magnesium, such as sepiolite fibres, paligorskite fibres (also known as attapulgite), possibly organically modified, or mixtures thereof.

Examples of silicate fibres with needle-shaped morphology, which can be used according to the present invention, are the sepiolites Pangel S9 or Pansil 100 or the organically modified sepiolites Pangel B5, Pangel B20, Pangel B40, commercialised by Tolsa Group (http://www.tolsa.com/).

In the preparation of the compositions according to the present invention, the aforesaid silicate fibres are modified according to a process which represents a fifth aspect of the present invention.

Said process preferably comprises:
providing silicate fibres with needle-shaped morphology of nanometric size comprising magnesium, wherein said fibre are sepiolite fibres,
suspending said fibres in a suitable liquid medium,
adding, to the suspension, at least one acid compound bringing the pH of the medium to between 2 and 4,
allowing the reaction, maintaining the pH of the medium to between 2 and 4, by further addition of acid, up to extracting from 10% to 70% by weight of magnesium from the fibres, substantially preserving their crystalline structure and needle-shaped morphology and
separating the fibres thus modified from the final medium.

Preferably the process for modifying silicate fibres with needle-shaped morphology of nanometric size according to the invention comprises
providing silicate fibres with needle-shaped morphology of nanometric size comprising magnesium,
suspending said fibres in water, or one or more mono- or poly-alcohol $C_1$-$C_6$ or mixtures thereof with water,
adding, to the suspension, at least one acid compound bringing the pH of the medium to between 2 and 4,
allowing the reaction, maintaining the pH of the medium to between 2 and 4, by further addition of acid, up to extracting from 10% to 70% by weight of magnesium from the fibres, substantially preserving their crystalline structure and needle-shaped morphology and
separating the fibres thus modified from the final medium.

The process of preparation of the modified fibres comprises one or more of the following characteristics, taken separately or in combination.

Generally, the silicate fibres, in particular the natural sepiolite fibres, employed in the present process comprise originally from 12.5% to 15.5% of magnesium with respect to the weight of the fibres themselves. Sepiolite fibres originally comprising around 15% of magnesium are particularly preferred. The process of preparation of the modified fibres first of all provides for the suspension of the silicate fibres with needle-shaped morphology of nanometric size in a suitable liquid medium.

Preferably said suitable liquid medium is selected from water, alcohols, ethers, ketones and mixtures thereof, more preferably is selected from water, mono- or poly-alcohols $C_1$-$C_6$ and mixtures thereof. Preferably the liquid medium is water. Advantageously the Applicant has found that the reaction proceeds as desired simply in water, without having to add an alcohol for controlling the magnesium extraction speed, in conditions that are more secure and advantageous industrially.

Alternatively, the liquid medium can be an alcohol $C_1$-$C_6$, more preferably isopropanol, or a mixture of water and at least one alcohol $C_1$-$C_6$, more preferably water and isopropanol.

It is observed that the use of mono- or poly-alcohols, possibly mixed with water, as liquid medium allows an even slower removal of magnesium from the fibres with respect to the same process conducted only in water (as shown in the comparative examples 3 and 4—in which the liquid medium is isopropanol-water and the extraction of magnesium around 35%—with respect to the comparative example 2a—where the solvent is water and with similar acid concentration and time and temperature conditions the extraction is substantially complete).

Preferably, said liquid medium is used in a volume/weight ratio with respect to the fibres comprised between 2 and 100 ml/g, preferably between 2 and 50 ml/g, more preferably between 4 and 15 ml/g. Preferably the suspension of the fibres in the liquid medium is carried out under stirring.

Said suspension can be carried out with different means, for example by using a mechanical blade stirrer, a mechanical mixture, e.g. of the type used for mixing paints or mortar, a mechanical stirrer or sonication stirrer.

The present process then provides for gradually adding at least one acid compound to the suspension. With the term "gradually adding to the suspension" it is intended to indicate that, unlike the prior art, where in similar treatments all of the acid was added at the start of the reaction, in the present process one instead proceeds with a gradual addition of the acid, in successive aliquots, such to bring and then maintain the pH of the medium between 2 and 4. With this gradual addition mode, at any moment the content of free acid in the reaction medium is always much below the stoichiometry.

Preferably the gradual addition of the acid compound is carried out under stirring.

Preferably the acid is gradually added by means of an automatic doser driven by a pH-meter. This apparatus is commonly used in the silica industry for precipitating the sodium silicate by controlling the precipitation kinetics. The Applicant has found that the same apparatus can be advantageously used also for the acid treatment of extraction of the magnesium from the silicate fibres according to the invention.

Due to the gradual addition and to the controlled pH, the moles of hydrogen ions present in solution during the reaction are always much lower than the moles of magnesium present initially in the silicate.

Preferably the quantity of added acid overall is lower than 1.4, preferably lower than 1.0, 0.8 or 0.6 moles/mole of magnesium present initially in the silicate.

Preferably the quantity of acid added overall is comprised between 0.75 and 0.4 moles/mole of magnesium present initially in the silicate.

Unexpectedly, unlike the teaching of the prior art, the progressive addition of the acid, which in the medium is always at concentrations well below the stoichiometry, equally allows the extraction of the magnesium in an efficient manner and without requiring a rigorous control of the times, temperatures or reaction solvents employed, all benefiting the industrial applicability of the present process.

Preferably the acid compound is gradually added in a quantity such to be in the reaction medium in a concentration not higher than 0.01N, more preferably not higher than 0.005N.

Preferably the at least one acid compound is gradually added in a manner such that the concentration of hydrogen ions in the reaction medium is comprised between 0.01 and 0.0005N, more preferably between 0.002N and 0.0008N.

In the present process, the gradual addition of the acid compound is carried out in a manner so as to maintain the pH of the medium between 2 and 4, preferably between 2.5 and 3.5, more preferably between 2.8 and 3.2, still more preferably at a pH of about 3.

Preferably as acid compounds, one or more strong inorganic acids are used, preferably selected from among hydrochloric acid, nitric acid, phosphoric acid and sulphuric acid, or organic acids are used selected from among acetic acid, formic acid, propionic acid, citric acid, tartaric acid and benzoic acid and mixtures thereof. Preferably hydrochloric acid is used.

Possibly, at least one silanising agent can be added to the suspension of the fibres. In such case, the medium is preferably a mono- or poly-alcohol $C_1$-$C_6$, more preferably isopropanol, or mixtures thereof with water, more preferably a water-isopropanol mixture.

Preferably the silanising agent is selected from among mono or bifunctional silanes with one or two or three hydrolysable groups such as bis-(triethoxysilylpropyl)disulphide (TESPD), bis[3-(triethoxysilyl)propyl]tetrasulphide (TESPT), 3-thio-octanoyl-1-propyltriethoxysilane (NXT), $Me_2Si(OEt)_2$), $Me_2PhSiCl$, $Ph_2SiCl_2$, more preferably is selected from between TESPD and TESPT. Preferably the silanising agent is added in a quantity comprised between 3% and 100% by weight with respect to the weight of the fibres.

Preferably the acidified suspension of the fibres, possibly comprising the silanising agent, is allowed to react under stirring.

Preferably the suspension of the fibres, comprising at least one acid compound and possibly at least one silanising agent, is allowed to react at a temperature of at least 20° C., more preferably of at least 40° C., 50° C., 60° C.

Preferably the suspension of the fibres comprising at least one acid compound and possibly at least one silanising agent, is allowed to react at a temperature not higher than 100° C., 90° C., 80° C.

Preferably the suspension of the fibres comprising at least one acid compound and possibly at least one silanising agent, is allowed to react at a temperature comprised between −10° C. and the boiling temperature of the medium, more preferably between 20 and 100° C., more preferably between 20° C. and 70° C.

Preferably the acidified suspension of the fibres, possibly comprising the silanising agent, is allowed to react at a pressure lower than 100 bar, more preferably at ambient pressure.

Preferably the acidified suspension of the fibres, possibly comprising the silanising agent, is allowed to react for a time of at least 5 minutes, preferably of at least 10 or 20 minutes, the reaction time depending on different variables such as the desired extent of extraction of the magnesium, the temperature, the dilution, the stirring, etc.

Preferably the reaction is not continued beyond 50 hours, preferably not beyond 20 hours, more preferably not beyond 10 hours.

Advantageously, by maintaining the pH of the reaction medium within the previously defined limits, the optimal removal of the magnesium is obtained, in the desired quantities, without requiring a strict control of the other reaction conditions in order to prevent an excessive depletion, in particular of the solvents and times.

The other possible process conditions can be suitably selected by the man skilled in the art, following the indications provided in the present description.

Such man can easily verify the quantity of magnesium extracted from the fibres—which must be from 10% to 70% by weight and the substantial preservation of the crystalline structure and of the needle-shaped morphology of the fibres themselves by means of the IR analysis thereof and observation at the microscope, by applying known techniques, illustrated in the present experimental part.

The percentage by weight of extracted magnesium is calculated with respect to the total weight of magnesium originally contained in the fibres, i.e. before the present treatment.

Generally, silicate fibres, in particular natural sepiolite fibres, originally comprise from 12.5% to 15.5% of magnesium with respect to the weight of the fibres themselves.

Sepiolite fibres originally comprising around 15% of magnesium are particularly preferred.

Alternatively it is possible to proceed with the determination of the content of absolute residual magnesium in the fibres after treatment.

Preferably, the modified silicate fibres with needle-shaped morphology of nanometric size according to the above-described process comprise from 3.8% to 12%, preferably from 9.5% to 12% of magnesium with respect to the weight of the fibres themselves.

The determination of the absolute content of magnesium in the modified silicate fibres can be carried out according to known analytical methods (see as general reference the text "TREATISE ON SOLID STATE CHEMISTRY"; Ed. Norman Bruce Hannay; 1a Ed. (1921), Vol. 1: "The Chemical Structure of Solids", chapter 2.3), such as atomic emission spectroscopy (AES) or atomic absorption spectroscopy, plasma mass spectrometry (Inductively coupled plasma mass spectrometry or ICP-MS), isotopic dilution or conventional analyses of gravimetric type.

Preferably the extraction reaction is continued up to extracting at least 15%, 20%, 25%, 30% by weight of magnesium from the fibres.

Preferably the reaction is continued up to extracting not more than 65%, 60%, 50%, 40% by weight of magnesium from the fibres.

Preferably the reaction is continued up to extracting from 15% to 70%, preferably from 20% to 60%, still more preferably from 20% to 40%, from 20% to 35% by weight of magnesium from the fibres.

Preferably the modified fibres with needle-shaped morphology comprise a residual quantity of magnesium equal to at least 30%, 40%, 50%, 60%, 80%, 90% of the quantity of magnesium initially present in the fibres.

Preferably the modified fibres with needle-shaped morphology comprise a residual quantity of magnesium equal to at least 90%, preferably at least 80% or 70% or 60% of the quantity of magnesium initially present in the fibres before the present treatment.

Preferably the quantity of magnesium extracted from the fibres is determined according to XRF analysis as described in the experimental part.

Preferably the separation of the modified fibres is conducted via filtration, followed by washing with a suitable liquid medium, preferably equivalent to that used in the reaction, preferably water, followed by air or vacuum drying, possibly by heating until the solvent is removed.

Advantageously, the gradual addition of acid of the present process also simplifies the final working, which can avoid the neutralisation step, since the water washing is sufficient.

Preferably the water washing is conducted until a substantially neutral solid is obtained, i.e. a solid which when suspended in water at 1% by weight does not cause a variation of the pH of more than two units with respect to neutrality, i.e. it leads to a suspension with pH comprised between 5 and 9. The determination of the quantity of magnesium extracted from the fibres or residual can be carried out by means of conventional analytical techniques such as complexometric methods, spectroscopy methods such as X-ray fluorescence (XRF) or atomic emission spectroscopy, preferably by means of X-ray fluorescence.

The Applicant has observed that by applying the above-described process conditions, the silicate fibres are modified without substantially altering the crystalline structure and the needle-shaped morphology thereof. Indeed, by partial extraction of magnesium, the morphology of the fibres is substantially preserved, as can be detected from microscopic observation (e.g. FIG. 5) and the crystalline structure is also substantially preserved, in accordance with the XRPD and IR analyses (FIGS. 8 and 10).

According to the present invention, the silicate fibres with needle-shaped morphology of nanometric size, modified according to the above-described process, are incorporated in the diene elastomeric polymer together with the other components in order to produce the elastomeric composition for tyre components.

Preferably said modified fibres are present in the elastomeric composition in a quantity from 1 phr to 60 phr, preferably from 3 phr to 40 phr, more preferably from 5 phr to 30 phr.

The elastomeric composition according to the present invention can also comprise (c) a standard reinforcement filler.

With the term "standard reinforcement filler" it is intended a reinforcement filler commonly used in the tyre field, preferably selected from among carbon black, precipitated amorphous silica, amorphous silica of natural origin, such as diatomaceous earth, calcium carbonate, titanium dioxide, talc, alumina, aluminosilicates, kaolin, non-modified silicate fibres and mixtures thereof.

With the phrase "non-modified silicate fibres", it is intended non-modified silicate fibres according to the present process of controlled acidic extraction of magnesium.

Possibly, the silicate fibres can be modified in a different manner, for example they can be treated with a compatibliser, preferably selected from among quaternary ammonium salts, such as the fibres Pangel B5, or phosphonium salts, known in the field, as described for example in WO2012164433A1.

Preferably, the elastomeric composition according to the present invention comprises (c) a standard reinforcement filler.

Preferably the standard reinforcement filler is selected from among carbon black, precipitated amorphous silica, amorphous silica of natural origin, non-modified silicate fibres and mixtures thereof. Preferably, the standard reinforcement filler (c) is present in the elastomeric composition in a quantity generally comprised between 1 phr and 120 phr, preferably between 20 phr and 90 phr.

Preferably, the overall quantity of modified fibres (b) and standard filler (c) present in the elastomeric composition according to the invention is at least 20 phr, more preferably at least 30 phr.

Preferably, the overall quantity of modified fibres (b) and standard filler (c) present in the elastomeric composition according to the invention is comprised between 20 phr and 120 phr, more preferably between 30 phr and 90 phr.

Preferably, the standard reinforcement filler (c) is carbon black having a surface area not lower than 20 m$^2$/g (determined by STSA—statistical thickness surface area according to ISO 18852:2005). Preferably, said reinforcement carbon black (c) filler is present in the elastomeric composition in a quantity comprised between 1 phr and 120 phr, preferably between 20 phr and 90 phr.

Preferably, the standard reinforcement filler is silica, selected from among a pyrogenic silica or, preferably, a precipitated silica, with a surface area BET (measured according to Standard ISO 5794/1) comprised between 50 m$^2$/g and 500 m$^2$/g, preferably between 70 m$^2$/g and 200 m$^2$/g.

The elastomeric composition according to the present invention can possibly also comprise at least one silane coupling agent (d) capable of interacting with the silica possibly present as reinforcement filler and/or the silicates and to bind them to the diene elastomeric polymer during the vulcanisation. Preferably the elastomeric composition comprises at least one coupling agent.

Preferably, the silane coupling agent (d) which can be used in the present invention is selected from among those having at least one hydrolysable silane group, which can be identified, for example, from the following general formula (I):

$$(R)_3Si-C_nH_{2n}-X \quad (I)$$

where the groups R, which can be identical or different, are selected from: alkyl, alkoxy or aryloxy groups or from halogen atoms, as long as at least one of the groups R is an alkoxy group or aryloxy group or a halogen; n is an integer between 1 and 6 included; X is a group selected from: nitrous, mercapto, amino, epoxide, vinyl, imide, chloro, —(S)$_m$C$_n$H$_{2n}$—Si—(R)$_3$ and —S—COR, where m and n are integer numbers between 1 and 6 included and the groups R are defined as above.

Among the silane coupling agents, those particularly preferred are bis(3-triethoxysilylpropyl) tetrasulphite and bis(3-triethoxysilylpropyl) disulphide. Said coupling agents can be used as is or as a mixture adapted with an inert filler (e.g. carbon black) so as to facilitate their incorporation in the elastomeric composition.

Preferably, said silane coupling agent (d) is present in the elastomeric composition in a quantity comprised between 0.1 phr and 20 phr, preferably between 0.5 phr and 10 phr.

The vulcanisable elastomeric composition according to the present invention comprises at least one vulcanisation agent (e).

The vulcanisation agent most advantageously used is sulfur, or alternatively molecules containing sulfur (sulfur donors), with accelerators, activators and/or retardants known to those skilled in the art. The sulfur or derivatives thereof can be advantageously selected, for example, from among: (i) soluble sulfur (crystalline sulfur); (ii) insoluble sulfur (polymer sulfur); (iii) sulfur dispersed in oil (for example 33% sulfur known with the commercial name of Crystex OT33 by Eastman); (iv) sulfur donor such as, for example, caprolactam disulfide (CLD), bis[(trialkoxysilyl)propyl]polysulphides, dithiophosphates; and mixtures thereof.

The vulcanisation agent (e) is present in the vulcanisable elastomeric composition of the invention in a quantity from 0.1 to 15 phr, preferably from 0.5 to 10 phr, still more preferably from 1 to 7 phr.

Preferably the vulcanisation agent (e) is used in combination with accelerants (f) and activators (g) known to the men skilled in the art.

The accelerants (f) that are commonly used can be selected from among: dithiocarbamates, guanidine, thioureas, thiazoles, sulfenamides, thiurams, amines, xanthates and mixtures thereof.

Preferably, the vulcanisation accelerants are present in the vulcanisable elastomeric composition of the invention in a quantity from 0.1 to 8 phr, preferably from 0.3 to 6 phr.

The activators (g) which are particularly effect are zinc compounds and in particular ZnO, ZnCO$_3$, zinc salts of saturated or unsaturated fatty acids containing from 8 to 18 carbon atoms, such as, for example, zinc stearate, which are preferably formed in situ in the vulcanisable elastomeric composition by ZnO and fatty acid, as well as Bi$_2$O$_3$, PbO, Pb$_3$O$_4$, PbO$_2$, or mixtures thereof.

Preferably the vulcanisation activators are present in the vulcanisable elastomeric composition of the invention in a quantity from 0.2 to 15 phr, preferably from 0.5 to 10 phr.

Finally, the above-described elastomeric materials can comprise other commonly used additives, selected on the basis of the specific application for which the composition is intended. For example, the following can be added to said materials: antioxidants, anti-aging agents, plasticisers, adhesives, anti-ozone agents, modifying resins, or mixtures thereof.

In particular, for the purpose of further improving the workability, the following can be added to said vulcanisable elastomeric composition: at least one plasticiser generally selected from among mineral oils, vegetable oils, synthetic oils, low molecular weight polymers and mixtures thereof, such as, for example, aromatic oil, naphthenic oil, phthalates, soy oil and mixtures thereof. The quantity of plasticiser is generally comprised between 0 phr and 70 phr, preferably between 5 phr and 30 phr. The above-reported elastomeric compositions can be prepared by mixing the polymer components together with the reinforcement filler and with the other additives possibly present according to the techniques known in the field. The mixing can be executed, for example, by using an open mixer of "open-mill" type or an internal mixer of the type with tangential rotors (Banbury®) or with co-penetrating rotors (Intermix), or in continuous mixers of Ko-Kneader™ (Buss®) type or of the type with twin screws or multiple screws.

A third aspect of the present invention regards a tyre component for vehicle wheels comprising a vulcanisable elastomeric composition, or at least partially vulcanised, obtainable by at least partial vulcanisation of the above-described vulcanisable elastomeric composition comprising said modified fibres.

The above-reported vulcanisable elastomeric compositions can be vulcanised according to known techniques, due to the presence of sulfur-based vulcanisation systems commonly used for diene elastomeric polymers. For this purpose, after one or more thermomechanical treatment stages, a vulcanisation agent, preferably sulfur-based, is incorporated in the materials, preferably together with vulcanisation accelerants. In the final treatment step, the temperature is generally maintained lower than 120° C. and preferably lower than 100° C., so as to prevent any undesired pre-crosslinking phenomenon. Subsequently, the vulcanisable composition is incorporated in one or more components of the tyre and subjected to vulcanisation, according to known techniques.

The tyre component according to the invention is preferably selected from tread, under-layer, bead protection layer, sidewall, sidewall insert, mini-sidewall, under-liner, rubber layers, bead filler and sheet, more preferably tread, under-layer and sidewall insert.

A fourth aspect of the present invention regards a tyre for vehicle wheels comprising at least one tyre component according to the invention, preferably selected from tread, under-layer, bead protection layer, sidewall, sidewall insert, a mini-sidewall, under-liner, rubber layers, bead filler and sheet, said component comprising said modified fibres.

Preferably in the tyre according to the invention, at least the tread comprises said vulcanised elastomeric material comprising modified silicate fibres according to the invention.

Preferably in the tyre according to the invention, at least the tread and at least one component selected from among under-layer, bead protection layer, sidewall, sidewall insert, mini-sidewall, under-liner, rubber layers, bead filler and sheet comprise said vulcanised elastomeric material.

One embodiment according to the present invention regards a tyre for vehicles, preferably a high-performance tyre (HP, SUV and UHP), comprising at least
one carcass structure comprising at least one carcass layer having opposite edges associated with respective bead structures;
one belt structure applied in radially external position to the carcass structure,
one tread band applied in radially external position to said belt structure, and possibly at least one under-layer and/or one bead protection layer and/or one sidewall and/or sidewall insert and/or one mini-sidewall and/or one under-liner and/or one rubber layer and/or one sheet,
wherein at least one from among said carcass structure and/or tread band and/or belt structure and/or under-layer and/or bead protection layer and/or sidewall pair and/or sidewall insert and/or one mini-sidewall and/or under-liner and/or rubber layer and/or bead structures and/or sheet comprises said above-described vulcanised elastomeric material.

Preferably, the tyre according to the invention comprises the above vulcanised elastomeric material at least in the tread or in the under-layer or in the sidewall insert.

Preferably, the tyre according to the invention comprises the above vulcanised elastomeric material in the tread and in one or more components selected from among under-layer, bead protection layer, sidewall, sidewall insert, under-liner, rubber layers, bead filler and sheet.

Preferably, the tyre according to the invention comprises the above vulcanised elastomeric material in the tread and in the under-layer.

Preferably, the tyre according to the invention comprises the above vulcanised elastomeric material in the tread and in the sidewall.

One embodiment according to the present invention is a tyre for vehicles, preferably for vehicles whose driving performances benefit from an increase of the rigidity and a reduction of the hysteresis and of the Payne effect of the elastomeric material, such as for example high-performance vehicles HP, SUV and UHP. The tyre according to the invention can be employed on vehicles with two or four wheels, or on heavy vehicles, or on light transport vehicles.

The tyre according to the invention can be for summer use, winter use or all-season.

The tyre according to the present invention can be manufactured according to a process that comprises:
forming components of a green tyre on at least one forming drum;
shaping, moulding and vulcanising the tyre;
wherein forming at least one of the green tyre components comprises:
making at least one green component comprising the vulcanisable elastomeric composition as previously described.

The term green is generally employed for indicating a material, a composition, a component or a tyre not yet vulcanised.

BRIEF DESCRIPTION OF THE DRAWINGS

FIG. 3 shows the images at the FESEM microscope (at 100000 power magnification) of sepiolite fibres with needle-shaped morphology modified under controlled conditions according to the known process F1 (Comparative example 1, FIG. 3A) and of sepiolite fibres F2a modified via drastic acid treatment in which the needle-shaped morphology has been lost (Comparative example 2a, FIG. 3B).

FIG. 4 (A and B) reports the images at the microscope (FESEM at 50000 power magnification) of modified fibres F3 and F6 according to the comparative examples 3 and 6, respectively (magnesium extracted: −35% and −20%).

FIG. 5 reports the images at the microscope (FESEM at 30000 power magnification) of modified fibres F8 and F9 according to the process of Examples 8 and 9 of the invention.

FIG. 9A shows the traces ATR-IR of a sample of modified sepiolite fibres F5 with needle-shaped morphology of the comparative example 5 and of a sample of original non-modified sepiolite fibres F-SE.

FIG. 11 reports the diffractograms XRD of a sample of natural non-modified sepiolite F-SE (comparative) and of a sample of comparative sepiolite F2b (prepared in example 2b) modified by means of drastic acid treatment, in which the needle-shaped morphology is maintained but the crystalline structure is lost.

DESCRIPTION OF EMBODIMENTS OF THE INVENTION

The description of several embodiments of the invention, provided only as a non-limiting example, is set forth hereinbelow.

Figure 1:
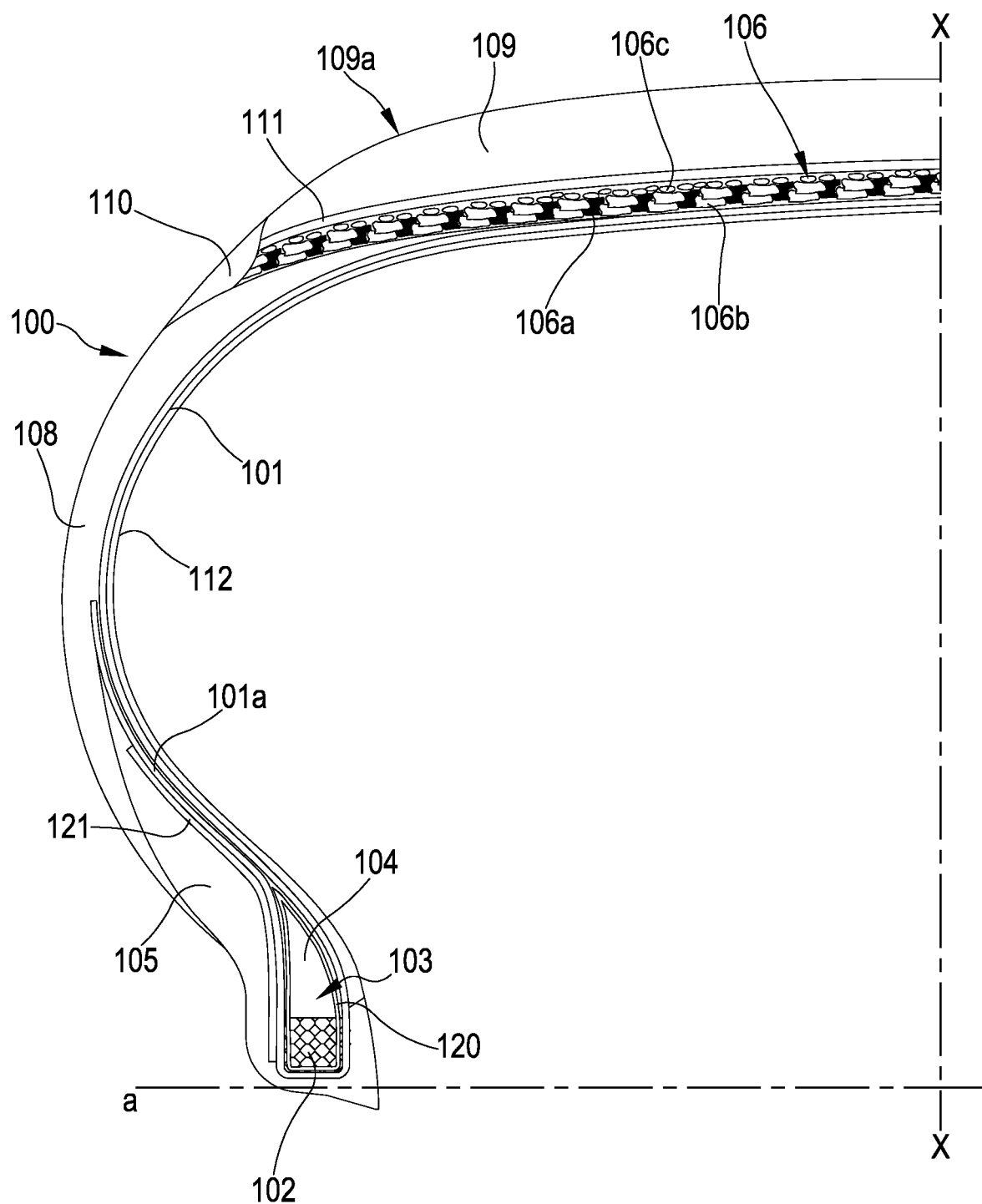
FIG. 1 illustrates a tyre for vehicle wheels in radial half-section.

FIG. 1 illustrates a tyre for vehicle wheels in radial half-section.

In FIG. 1, "a" indicates an axial direction and "X" indicates a radial direction, in particular X-X indicates the trace of the equatorial plane. For the sake of simplicity, FIG. 1 only shows a portion of the tyre, the remaining not represented portion being identical and symmetrically arranged with respect to the equatorial plane "X-X".

The tyre 100 for four-wheel vehicles comprises at least one carcass structure, comprising at least one carcass layer 101 having respectively opposite end flaps engaged with respective anchoring annular structures 102, termed bead cores, possibly associated with a bead filler 104.

The carcass layer 101 is possibly made with an elastomeric composition.

The zone of the tyre comprising the bead core 102 and the filler 104 forms a bead structure 103 intended for the anchoring of the tyre on a corresponding mounting rim, not illustrated.

The carcass structure is usually of radial type, i.e. the reinforcement elements of the at least one carcass layer 101 are situated on planes comprising the rotation axis of the tyre and substantially perpendicular to the equatorial plane of the tyre. Said reinforcement elements are generally constituted by textile cords, for example rayon, nylon, polyester (e.g. polyethylene naphthalate (PEN)). Each bead structure is associated with the carcass structure by means of folding back the opposite lateral edges of the at least one carcass layer 101 around the anchoring annular structure 102 so as to form the so-called turning up of the carcass 101a as illustrated in FIG. 1.

In one embodiment, the coupling between carcass structure and bead structure can be provided by means of a second carcass layer (not shown in FIG. 1) applied in an axially external position with respect to the first carcass layer.

A bead protection layer 105 possibly made with elastomeric composition is arranged in an external position of each bead structure 103.

The carcass structure is associated with a belt structure 106 comprising one or more belt layers 106a, 106b situated radially superimposed with respect to each other and with respect to the carcass layer, having reinforcement cords that are typically textile and/or metallic incorporated within a layer of vulcanised elastomeric material.

Such reinforcement cords can have cross orientation with respect to a circumferential extension direction of the tyre 100. By "circumferential" direction it is intended a direction generically directed according to the rotation direction of the tyre.

In radially more external position with respect to the belt layers 106a,106b, at least one zero degree reinforcement layer 106c can be applied, commonly known as "0° belt", which generally incorporates a plurality of elongated reinforcement elements, typically metallic or textile cords, oriented in a substantially circumferential direction, thus forming an angle of a few degrees (e.g. an angle between about 0° and 6°) with respect to a direction parallel to the equatorial plane of the tyre, and coated with vulcanised elastomeric material.

In radially external position with respect to the belt structure 106, a tread band 109 made of vulcanised elastomeric material is applied.

Respective sidewalls 108 made of vulcanised elastomeric material are also applied in axially external position on the lateral surfaces of the carcass structure, each extended from one of the lateral edges of the tread 109 up to the respective bead structure 103.

In radially external position, the tread band 109 has a rolling surface 109a intended to come into contact with the ground. Circumferential grooves, which are connected by transverse indentations (not represented in FIG. 1) so as to define a plurality of blocks of various shapes and sizes distributed on the rolling surface 109a, are generally made in this surface 109a, which for the sake of simplicity in FIG. 1 is represented smooth.

An under-layer 111 of vulcanised elastomeric material can be arranged between the belt structure 106 and the tread band 109.

A strip constituted by elastomeric composition 110, commonly known as "mini-sidewall", made of vulcanised elastomeric material may possibly be present in the zone of connection between the sidewalls 108 and the tread band 109, this mini-sidewall generally being obtained by means of co-extrusion with the tread band 109 and allowing an improvement of the mechanical interaction between the tread band 109 and the sidewalls 108. Preferably, the end portion of the sidewall 108 directly covers the lateral edge of the tread band 109.

In the case of tyres without air chamber, a rubber layer 112, generally known as "liner", which provides the necessary impermeability to the tyre inflation air, can also be provided in a radially internal position with respect to the carcass layer 101.

The rigidity of the tyre sidewall 108 can be improved by equipping the bead structure 103 with a reinforcement layer 120 generally known as "flipper" or additional strip-like insert.

The flipper 120 is a reinforcement layer that is wound around the respective bead core 102 and around the bead filler 104 so as to at least partially surround them, said reinforcement layer being arranged between the at least one carcass layer 101 and the bead structure 103. Usually, the flipper is in contact with said at least one carcass layer 101 and said bead structure 103.

The flipper 120 typically comprises a plurality of textile cords incorporated within a layer of vulcanised elastomeric material.

The bead structure 103 of a tyre can comprise a further protection layer which is generally known with the term "chafer" 121 or protection strip and which has the function of increasing rigidity and integrity of the bead structure 103.

The chafer 121 usually comprises a plurality of cords incorporated within a rubber layer of vulcanised elastomeric material. Such cords are generally made of textile materials (e.g. aramide or rayon) or of metallic materials (e.g. steel cords).

A layer or sheet of elastomeric material can be arranged between the belt structure and the carcass structure. The layer can have a uniform thickness. Alternatively, the layer can have a variable thickness in axial direction. For example, the layer can have a greater thickness close to its axially external edges with respect to the central (crown) zone.

Advantageously the layer or sheet can be extended on a surface substantially corresponding to the extension surface of said belt structure.

In a preferred embodiment, a layer or sheet made of elastomeric material as described above can be placed between said belt structure and said tread band, said supplementary layer or sheet preferably being extended on a surface substantially corresponding to the extension surface of said belt structure. The elastomeric composition according to the present invention can be advantageously incorporated in one or more of the components of the tyre selected from among belt structure, carcass structure, tread band, under-layer, sidewall, mini-sidewall, sidewall insert, bead, flipper, chafer, sheet and bead protection layer.

The elastomeric composition according to the present invention can comprise at least
(a) 100 phr of at least one diene elastomeric polymer;
(b) from 1 to 80 phr of modified silicate fibres of nanometric size, with substantially preserved needle-shaped morphology, comprising from 3.8% to 12% of magnesium,
said modified fibres being obtainable according to a process that comprises:
providing silicate fibres with needle-shaped morphology of nanometric size comprising magnesium ions,
suspending said fibres in a liquid medium,
adding, to the suspension, at least one acid compound bringing the pH of the medium to between 2 and 4,
allowing the reaction, maintaining the pH of the medium to between 2 and 4, by further addition of acid, up to extracting from 10% to 70% by weight of magnesium ions from the fibres, substantially preserving their crystalline structure and needle-shaped morphology and
separating the fibres thus modified from the liquid medium;
(c) from 0 to 120 phr of a standard reinforcement filler;
(e) from 0.1 to 15 phr of a vulcanisation agent, and
(d) from 0 to 20 phr of a coupling agent.

According to a non-illustrated embodiment, the tyre can be a tyre for motorcycle wheels, which is typically a tyre that has a straight section marked by a high transverse curvature.

According to a non-illustrated embodiment, the tyre can be a tyre for heavy transport vehicle wheels, such as trucks, buses, trailers, vans and generally for vehicles in which the tyre is subjected to a high load.

Preferably, one such tyre is adapted to be mounted on rims having diameter equal to or greater than 17.5 inches for directional or trailer wheels.

In order to better illustrate the present invention, the following examples are now provided.

Methods for the Analytical Characterisation of the Fibres

The original fibres, the fibres modified in drastic acidic conditions (Comparative examples 2a and 2b, comparative fibres) and the fibre, silanised and otherwise, modified in controlled acidic conditions (Comparative examples 3-7 and examples 8 and 9 of the invention), then incorporated in the elastomeric comparative materials and according to the invention, have been characterised with one or more of the following analytical techniques:

Metering of the Magnesium Present in the Fibres by X-Ray Fluorescence Spectrophotometry (XRF Spectroscopy):

the spectrophotometer Bruker AXS S4 Pioneer XRF was used, operating at ambient temperature. The samples were analysed by placing the powder in a sample holder having a window exposed to the incident radiation with 34 mm diameter, covered with a 4 micron polypropylene film. The measurement was conducted in helium at reduced pressure, using the standardless acquisition program "Fast-He34.mm" preset in the instrument, and processing the data with the software S4 tools using the formula $Si_6H_{14}O_{23}$ as matrix for the calculation. For greater correctness, the determination of the magnesium was carried out on the only component that was not decomposed when subjected in the TGA to oxidative treatment up to 800° C., as better explained in the comparative example 5. Finally, the percentage of extraction of the magnesium was calculated based on the quantity of magnesium present in the starting fibres, measured with the same method, as illustrated in the comparative example 5.

Metering of the Mg in the Acidic Reaction Medium by Complexometry

The magnesium extracted in the reaction medium can be measured by using, as in the literature ("Preparation of Silica by Acid Dissolution of sepiolite and Study of its reinforcing effect in Elastomers", Die Angewandte Makrom Chemie (1982), 103, 51-60), a complexometric method with EDTA.

In a typical procedure, 500 µl of filtration mother liquors are diluted with 100 ml of distilled water and treated with 4 ml of a buffer solution obtained by dissolving 5.4 g of $NH_4Cl$ in 60 ml of distilled water and 35 ml of aqueous $NH_3$ at 29% by weight. Two drops of eriochrome black T in 1% methanolic solution are added to the buffered solution. The solution is heated at 40-50° C. and titred with 0.01 M disodium EDTA up to colour change of the solution. From the titre of magnesium in the buffered solution, the total extracted magnesium is calculated, considering the quantity of supernatant drawn and the total volume of liquids in the reaction mixture.

The percentage of extracted Mg is then calculated based on the initial weight of fibres containing magnesium that are made to react, and on the initial percentage of Mg in such fibres, calculated from the molecular formula of magnesium silicate.

Field Emission Scanning Electron Microscopy FESEM:

the observations on the powders of the samples of the comparative example 5 (FIG. 2) and of the examples according to the invention 8 and 9 (FIG. 5) were made with a microscope Vega TS5136 XM Tescan in high vacuum configuration. The excitation of the electron ray was 30 kV with a current of 25 pA. Before the SEM analysis, the samples were attached to a metallic target with adhesive strip and subjected to sputtering with gold in order to improve the conductivity of the electrons through the material.

In the case of the comparative examples 1 and 2 (FIG. 3) and of the comparative examples 3 and 6 (FIG. 4), the samples were observed with a microscope FESEM Ultra Plus Zeiss, Gemini column, in InLens mode, excitation of the electron ray from 3.0 to 5.0 KV, work distance from 2.7 to 4.3 mm.

The samples were thus prepared: 0.005 g of fibres were dispersed in 50 ml of solution constituted by a mixture of water and ethanol in 8:2 ratio, admixed with 200 ppm of Nonidet P40 (surfactant purchased from Sigma-Aldrich) for treatment with ultrasound in immersion for 15 minutes. The fibres were separated by centrifugation at 1000 g/m for 20 minutes and dried in an oven at 100° for 3 hours.

Characterisation STEM of the Vulcanised Elastomeric Materials:

the observation was conducted on ultramicrotome thin sections (50 nm) under cold conditions (−120° C.) with a microscope FESEM Ultra Plus Zeiss, Gemini column, in InLens mode, excitation of the electron ray of 30 KV, work distance 2 mm.

X-Ray Diffraction (XRPD):

The diffractograms XRD have been recorded with a diffractometer Bruker D8 Avance (Cu K-alpha radiation) in the interval 20 up to 260 with A (20)=0.02 and 4s of interval between each acquisition.

Thermogravimetric Analysis (TGA):

the determination of the profile of the weight loss was carried out with the device Mettler Toledo TGA/DSC1 Star-e System, in a temperature interval from 150 to 800° C.

The measurements were made by using a temperature program which provides for a step with inert gas (ramp from 25 to 150° C. and a plateau at 150° C. in nitrogen flow) and an oxidation step (ramp from 150 to 800° C. in dry air flow).

Attenuated Total Reflectance Infrared Spectroscopy ATR-IR:

the measurements were carried out with the instrument Perkin Elmer Spectrum 100 (1 $cm^{-1}$ resolution, interval from 650-4000 $cm^{-1}$, 16 scans).

This analytical technique allows easily distinguishing the original sepiolite fibres F-SE and those modified according to the present process, characterised by more intense signals in the interval 850-1040 $cm^{-1}$—in two resolved signals or even in a single band—with respect to commercial silica, which instead shows very intense signals in the interval 1040-1300 $cm^{-1}$.

Preparation of the Fibres

Comparative Example 1

Preparation of Modified Sepiolite Fibres with Needle-Shaped Morphology F1 (Aqueous Environment, Partial Extraction of Magnesium)

Modified sepiolite fibres were prepared by using the following materials:
sepiolite Pangel S9 (5 g)
3M aqueous HCl (50 ml)
Procedure In a 250 ml glass flask, the sepiolite (5 g) is suspended in 50 ml of acid solution and it is heated in an oil bath at 60° C. for 10 minutes under stirring.

Then, the suspension is filtered over Buchner. The solid is washed with abundant deionised water (about 1.5-2 l) until the washing water lacks chloride ions (test of AgNO3). The complexometric analysis showed the presence in the filtration mother liquors of 31% of magnesium theoretically present in the starting silicate.

The recovered solid was finally dried in an oven at 70° C. for 120 hours. From the XRF analysis on the modified fibres, there was an extraction of magnesium equal to 33%, in good accordance with the complexometric data.

As is inferred from the microscopic examination reported in FIG. 3A, the morphology of the fibres was substantially maintained. In addition, the diffractogram of FIG. 7 and the spectrum IR of FIG. 9B confirmed the substantial preservation of the crystalline structure of the sample.

In particular, in order to evaluate the preservation of the crystillinity, in the spectrum IR, the areas under the four curves were measured, in the intervals between 850 and 1040 $cm^{-1}$ (zone of the typical signals of the crystalline structure) and between 1040 and 1300 $cm^{-1}$ (zone of the typical signals of the amorphous structure) with the following results:

|  | Material | | | | | |
| --- | --- | --- | --- | --- | --- | --- |
|  | SIL | F-SE | F1 | F2a | F8 | F9 |
| Area 1 (850-1040 $cm^{-1}$) | 2.7 | 11.6 | 7.6 | 4.7 | 11.4 | 10.7 |
| Area 2 (1040-1300 $cm^{-1}$) | 11.7 | 2.9 | 4.6 | 11.0 | 10.8 | 9.4 |
| Ratio Area 1/Area 2 | 0.23 | 4 | 1.65 | 0.43 | 1.06 | 1.15 |

As can be seen from the ratios between the above-calculated areas, the sepiolite fibres of the comparative example 1 showed a substantial preservation of the crystalline structure (ratio>0.8) while the modified sepiolite fibres of the following comparative example 2a substantially had lost the crystillinity (ratio<0.8). The same evaluation conducted on the fibres F8 and F9, prepared according to the process of the invention described hereinbelow in the examples 8 and 9, confirms the maintenance of the crystalline structure.

Comparative Example 2a

Preparation of Modified Sepiolite Fibres F2a (Aqueous Environment, Total Extraction of Magnesium)

This example substantially reproduces the processes described in the literature for generating amorphous silica by means of exhaustive acid treatment of the sepiolite fibres.

In particular, the procedure of the comparative example 1 is repeated, however continuing the reaction for a total of 70 minutes in the same conditions.

At the end of the process, the extraction of magnesium was high (95% according to the XRF method) and the morphology of the fibres no longer needle-shaped, as is visible in the image FE-SEM of FIG. 3B. In addition the crystalline structure was substantially lost, as shown by the diffractogram reported in FIG. 7 and by the IR spectrum in FIG. 9B. The amorphous silica thus obtained was subsequently incorporated in elastomeric materials and used as comparison term.

Figure 7:
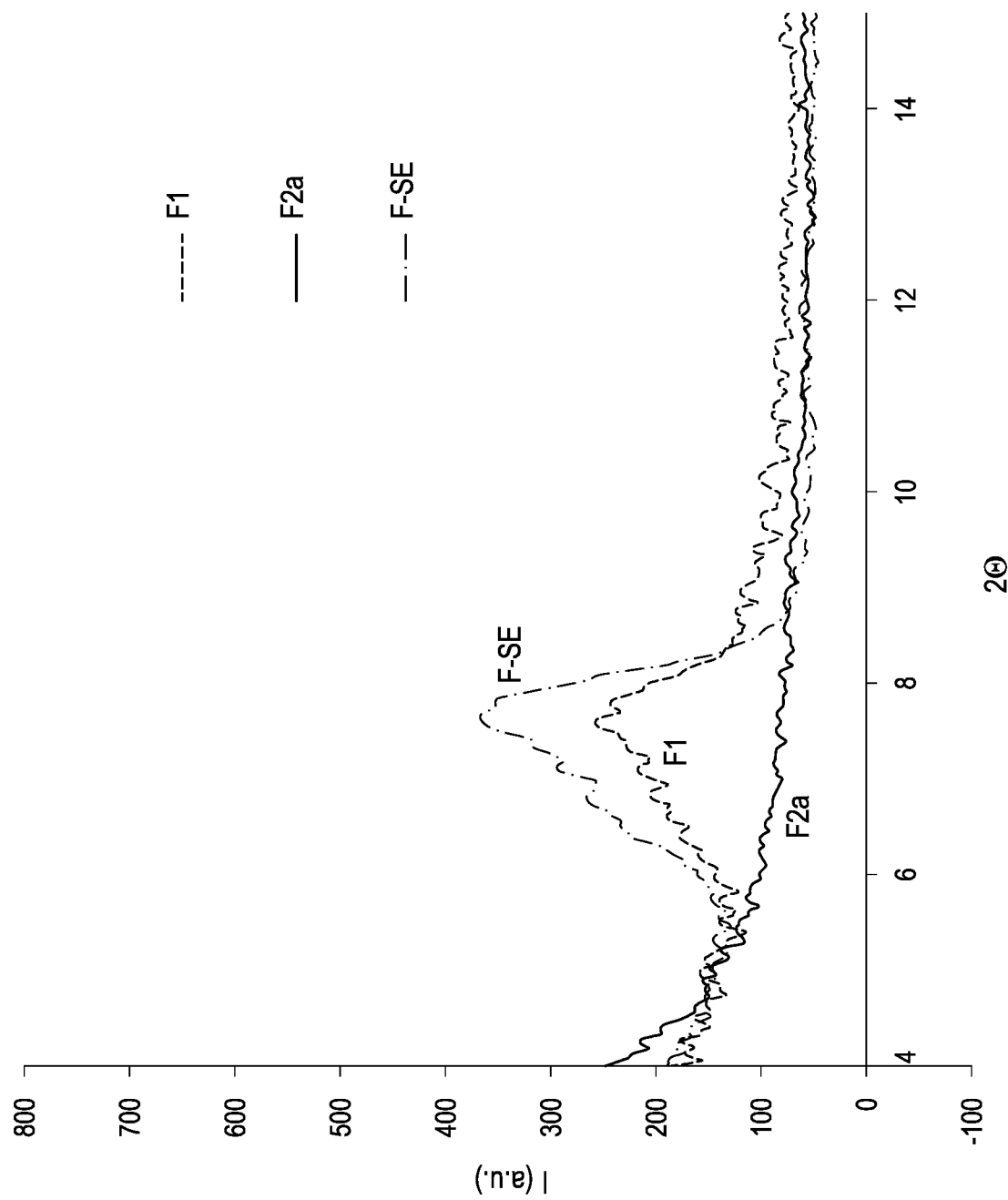
FIG. 7 reports the diffractograms XRD in the interval of 2theta from 4° to 14°, of samples of sepiolite fibres F1 modified as in the comparative example 1, of comparative samples F2a, modified as in the comparative example 2a, and of non-modified sepiolite fibres F-SE.

As is inferred from the diffractogram XRD of FIG. 7, the peak at 6°—8°—diagnostic of the crystalline order—was completely lost in the sample of the comparative example 2a, while it appeared widely preserved in the sample of the comparative example 1.

Comparative Example 2b

Preparation of Modified Sepiolite Fibres F2b (Aqueous Environment, Total Extraction of the Magnesium Ions)

This example substantially reproduces the processes described in the literature for generating amorphous silica by means of exhaustive acid treatment of the sepiolite fibres.

In particular, the procedure reported in the publication 'Preparation of Silica by Acid Dissolution of Sepiolite and Study of its Reinforcing Effect in Elastomers' was repeated in the same conditions (60° C., 5N $HNO_3$).

At the end of the process, the extraction of the magnesium ions was high (97% according to XRF method) but the morphology of the fibres is substantially needle-shaped. However the crystalline structure was substantially lost, as shown by the diffractogram reported in FIG. 11. The needle-shaped amorphous silica thus obtained was subsequently incorporated in elastomeric materials and used as comparison term.

As is inferred from the diffractogram XRD of FIG. 11, the peak at 6°-8°, diagnostic of the crystalline order (peak F-SE), is completely lost in the sample of the example 2b.

Comparative Example 3

Preparation of Modified Sepiolite Fibres F3 (Alcoholic Environment, Partial Extraction of Magnesium)

Modified sepiolite fibres were prepared by using the following materials:

sepiolite Pangel S9 (120 g)
Isopropanol (1.2 l)
aqueous HCl, 37% by weight (480 ml)
Deionised water (3 l)
aqueous $NH_3$, 29% by weight Procedure 120 g of sepiolite Pangel S9 was loaded in a two-neck 3-litre flask, equipped with mechanical stirrer and reflux and immersed in an oil bath at 80° C. 1.2 l of isopropanol pre-heated at 65° C. were added and the mixture was stirred for 15 minutes at 600 rpm. 480 ml of aqueous HCl at 37% by weight were added. The mixture was held under stirring for 120 minutes at 65° C. and then filtered over Buchner. The solid was suspended in 2 l of deionised water. Then, an aqueous solution of $NH_3$ at 29% by weight was added until pH 7.0±0.2 was reached. The solid was collected on Buchner and washed with 1 l of deionised water and then it was dried in an oven 120° C. for 72 h.

From the XRF analysis of a product sample, 35% by weight of magnesium resulted extracted.

Upon microscopic observation (FIG. 4A), the sample maintained the morphology of the sepiolite fibres. The IR analysis showed predominant signals between 850 and 1040 $cm^{-1}$ in the characteristic region of the non-modified sepiolite fibres and not between 1040 and 1300 $cm^{-1}$, zone of the typical signals of amorphous silica, indication of the substantial maintenance of the crystalline structure.

Comparative Example 4

Preparation of Modified Sepiolite Fibres F4 (Alcoholic Environment, Presence of Silanising Agents, Partial Extraction of Magnesium)

Modified sepiolite fibres were prepared by using the following materials:

sepiolite Pangel S9 (120 g)
bis[3-(triethoxysilyl)propyl]tetrasulphide TESPT (64.7 g)
Isopropanol (1.2 l)
aqueous HCl, 37% by weight (480 ml)
Deionised water (3 l)
aqueous $NH_3$, 29% by weight Procedure 120 g of sepiolite Pangel 39 were loaded in a two-neck 3-litre flask, equipped with a mechanical stirrer and reflux and immersed in an oil bath at 80° C. 1.2 l of isopropanol pre-heated at 65° C. were loaded and the mixture was stirred for 15 minutes at 600 rpm. 64.7 g of TESPT were added, and subsequently 480 ml of aqueous HCl at 37% by weight were added. The mixture was held under stirring for 120 minutes at 65° C. and then filtered over Buchner. The solid was suspended in 2 l of deionised water. Then a solution of $NH_3$ at 29% by weight was added until pH 7.0±0.2 was reached. The solid was collected on Buchner, washed 1 l of deionised water and dried in oven at 120° C. for 72 h. From the XRF analysis of a product sample, 35% by weight of magnesium resulted extracted. The complexometric analysis indicated the presence, in the filtration mother liquors, of 32% of magnesium theoretically present in the starting silicate. The result is in good accordance with the XRF data.

Upon microscopic observation, the sample maintained the morphology of the sepiolite fibres. The IR analysis showed predominant signals between 850 and 1040 $cm^{-1}$ in the characteristic region of the non-modified sepiolite fibres, indication of the substantial maintenance of the crystalline structure, and not between 1040 and 1300 $cm^{-1}$, zone of the typical signals of amorphous silica.

Comparative Example 5

Preparation of Modified Sepiolite Fibres F5 (Alcoholic Environment, Presence of Sulfur Silanising Agents, Partial Extraction of Magnesium)

Modified sepiolite fibres were prepared by using the following materials:
sepiolite Pangel S9 (sepiolite) supplied by Tolsa
TESPT bis[3-(triethoxysilyl)propyl]tetrasulphide, isopropanol, and 37% aqueous hydrochloric acid supplied by Aldrich.
aqueous $NH_3$ at 29% by weight was employed for the final neutralisation of the modified fibres, and deionised water was employed for the washing.
Procedure
In a reaction flask, 120 g of sepiolite were suspended in 1200 ml of isopropanol at 65° C. After 10 minutes of vigorous stirring (800 rpm, mechanical stirring) 13 g of TESPT were added, followed by 96 ml of 37% aqueous hydrochloric acid.

It was left under energetic stirring (600 rpm) at 65° C., for 72 hours.

The reaction mixture was filtered over Buchner and the solid was suspended in 2 l of deionised water. Then, a solution of NH3 at 29% by weight was added until pH 7.0±0.2 was reached. The solid was collected over Buchner, washed with 1 l of deionised water and dried in oven at 120° C. for 48 h.

Figure 2:
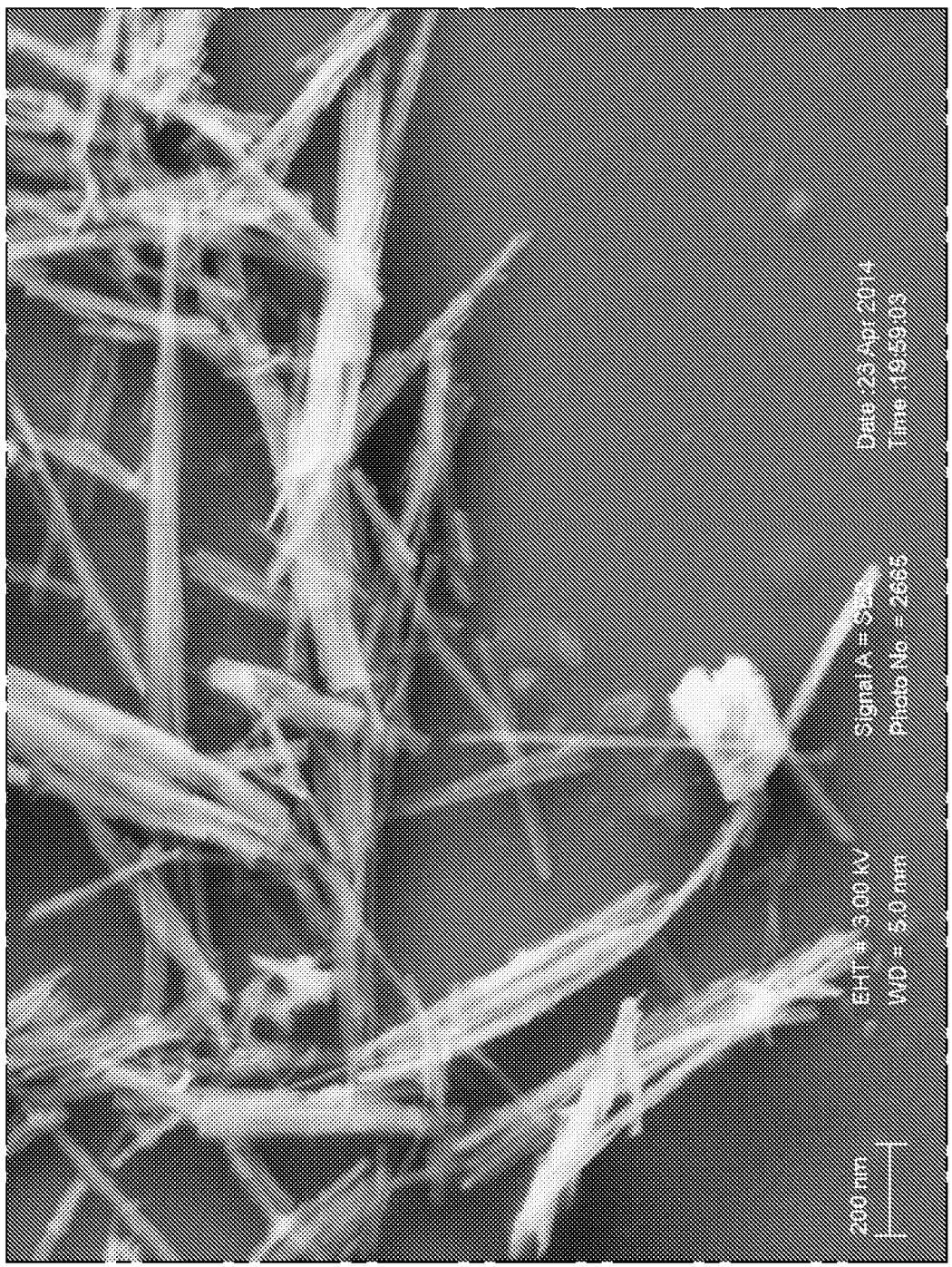
FIG. 2 reports an image at the FESEM microscope (Field Emission Scanning Electron Microscopy, 100000 power magnification) of modified sepiolite fibres with needle-shaped morphology F5 of the comparative example 5.
Figure 6:
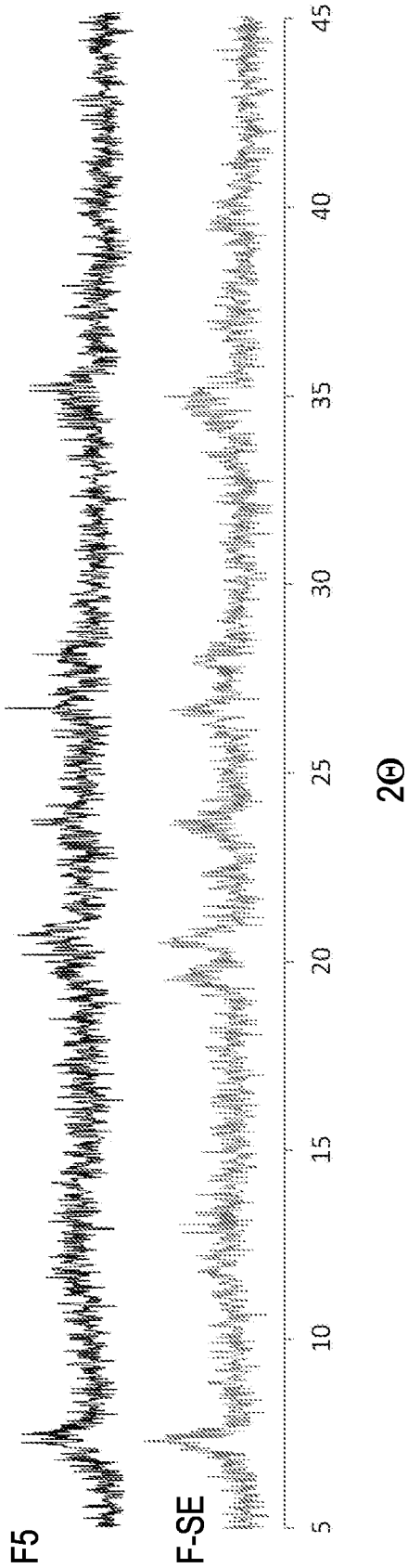
FIG. 6 reports the diffractograms XRD of a sample of natural non-modified sepiolite F-SE (comparative) and of a sample of sepiolite F5 modified by means of mild acid treatment as in the comparative example 5.

The powder thus obtained (modified fibres) was characterised and compared with original sepiolite fibres by means of the following techniques and with the following results:
FE-SEM Microscope Evaluation (FIG. 2):

FIG. 2 shows the modified sepiolite fibres, needle-shaped and of nanometric size, of the comparative example 5. These fibres have an average diameter of 20±5 nm and a length of 460±400 nm, with an aspect ratio of approximately 23±10.
XRD Analysis (FIG. 6)

Figure 8:
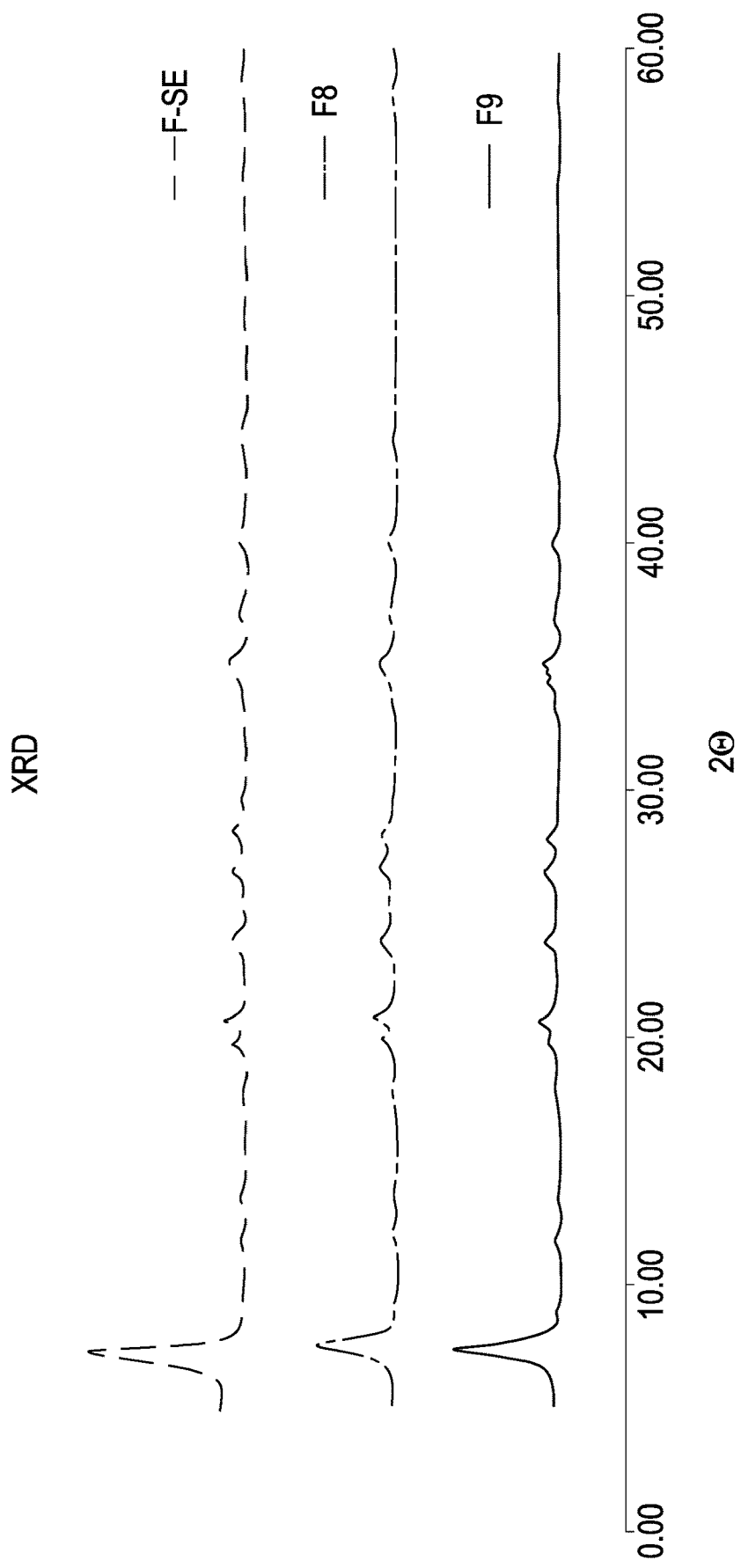
FIG. 8 reports the diffractograms XRD of samples of sepiolite F8 and F9 modified by means of progressive acid treatment with controlled pH according to the examples of the invention 8 and 9.

The XRD analysis on modified sepiolite according to the comparative example 5 (F5) and on original non-modified sepiolite (F-SE) shows that the treatment in controlled acidic conditions has not substantially modified the crystalline structure of the sepiolite. Indeed, the typical diffractogram of the original sepiolite (Pangel S9) is strictly comparable with that of the comparative sample of modified sepiolite, in particular the peak at 2 theta 7.5° is recognisable, characteristic of the sepiolite. Analogous considerations hold true for the samples according to the invention F8 and F9 (FIG. 8).
Thermogravimetric Analysis TGA The loss of weight during the TGA (from 150 to 800° C.) was calculated to be equal to 6.5% by weight for the sample of original non-modified sepiolite (F-SE) and to 17.6% by weight for the sample of the silanised comparative example 5 treated in controlled acidic conditions (F5).
Spectroscopic Analysis ATR-IR (FIGS. 9A and 9B)

The samples of original non-modified sepiolite F-SE and of sepiolite F5 modified in controlled conditions of the comparative example 5 were subjected to IR analysis in order to evaluate the chemical modifications induced by the controlled acid treatment.

As can be seen in FIG. 9A, the two traces are generally very similar: appearing in both are the signals due to the stretching of the bonds of the groups OH bonded to the magnesium (3500-3700 $cm^{-1}$) and to the silicon (3760-3730 $cm^{-1}$) and the double peak of the stretching of the bond Si—O (stretching SiOSi and SiOMg) at about 1000 $cm^{-1}$—typical of the magnesium silicates such as sepiolite and like the modified sepiolite fibres according to the present process.

Figure 9B:
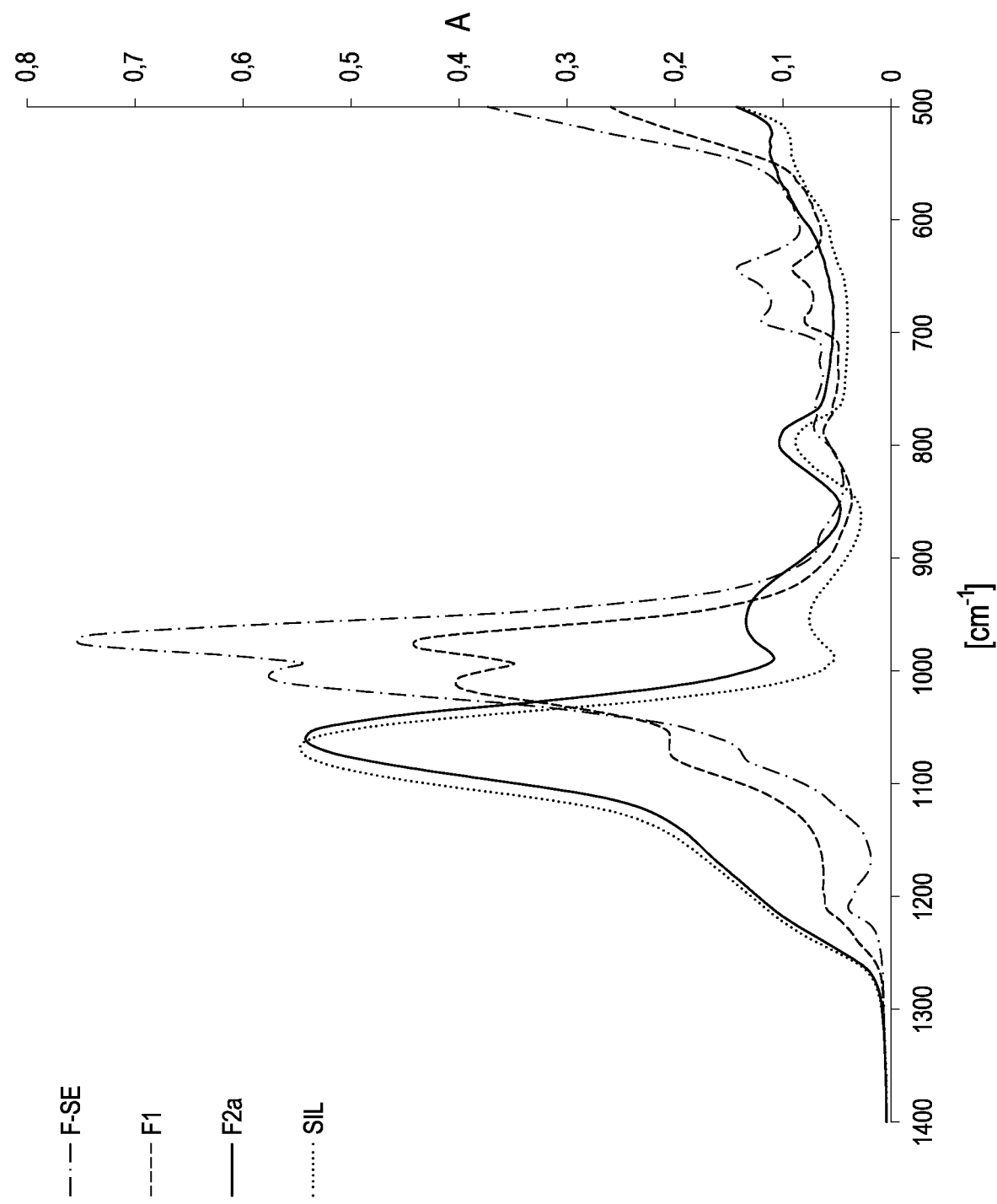
FIG. 9B shows a significant portion of the traces ATR-IR of samples of commercial silica (SIL), of non-modified sepiolite fibres (F-SE), of modified fibres of the comparative example 1 (F1) and of the comparative example 2a (F2a).

FIG. 9B instead shows a detail of the IR spectra of commercial silica (SIL), of the non-modified sepiolite (F-SE), of the modified sepiolite with partial extraction of the magnesium of the comparative example 1 (F1) and with total extraction of the comparative example 2a (F2a).

Figure 10A:
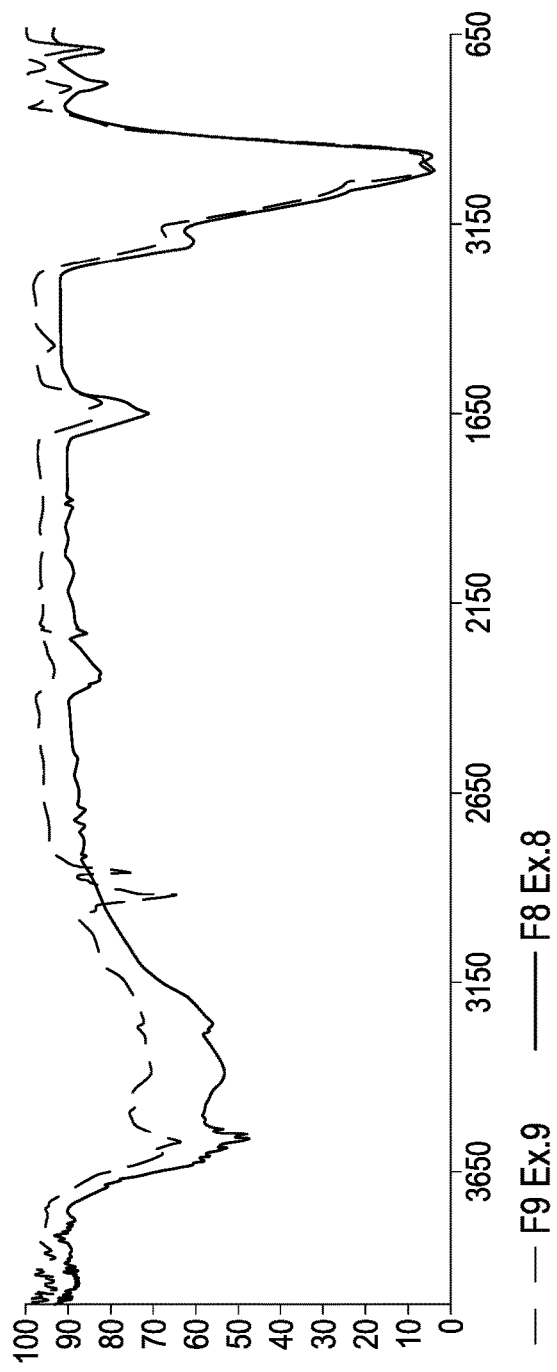
FIG. 10A shows the traces ATR-IR of samples of modified sepiolite fibres F8 and F9 with needle-shaped morphology of the examples 8 and 9 according to the invention.
Figure 10B:
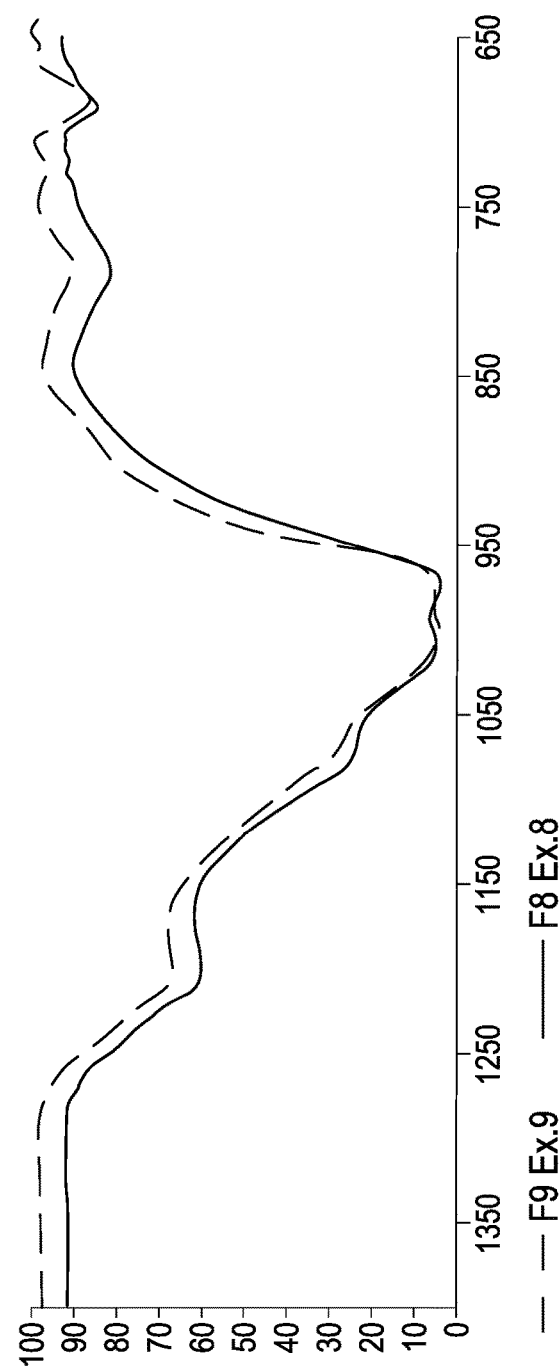
FIG. 10B shows a significant portions of the traces ATR-IR reported in FIG. 10A relative to the samples of modified fibres F8 and F9 according to the examples 8 and 9 of the invention.

As can be observed, the sample of the comparative example 1, like the non-modified sepiolite, shows a strong absorption between 850 and 1040 $cm^{-1}$, while the commercial silica and the sample F2a, from which about 95% of Mg was extracted, give rise to more intense peaks between 1040 and 1300 $cm^{-1}$. The same IR analysis (FIG. 10) conducted on samples according to the invention F8 and F9 showed, in the interval between 850 and 1040 cm–1, predominant signals with respect to those between 1040 and 1300 cm–1, indication of the substantial maintenance of the crystalline structure.
Determination of the Magnesium by Complexometry The quantity of magnesium extracted from the fibres was carried out by means of complexometric titration on the filtration mother liquors: 500 µl of filtration mother liquors were diluted with 100 ml of distilled water and treated with 4 ml of a buffer solution obtained by dissolving 5.4 g of $NH_4C_1$ in 60 ml of distilled water and 35 ml of aqueous solution of $NH_3$ at 29% by weight.

Two drops of eriochrome black T in 1% methanolic solution are added to the buffered solution. After having heated the solution at 40-50° C., titration with 0.01 M disodium EDTA up to colour change of the solution. From the titre of magnesium in the buffered solution, the extracted magnesium was calculated by considering the quantity of supernatant drawn (500 µl) and the total volume of liquids in the reaction mixture (1296 ml)

The percentage of extracted Mg was then calculated based on the initial quantity of fibres containing magnesium that were made to react (120 g), and on the initial percentage of Mg in such fibres, calculated from the molecular formula of the magnesium silicate $Mg_4Si_6O_{15}(OH)_2(H_2O)_6$, i.e. of a percentage by initial weight of magnesium of 15%.

The percentage of extracted Mg was equal to 25% of the initially present Mg.
Determination of Magnesium by XRF Spectroscopy From XRF analysis, the quantity of magnesium in the fibres was determined, before (sample F-SE, Sepiolite as is) and after controlled acid treatment (comparative sample F5, sample treated as described above).

The results of these analyses are shown in the following Table 1.

TABLE 1

| | Mg % measured | Mg % Recalculated on TGA residue | Mg % extract |
|---|---|---|---|
| sepiolite F—SE | 13.1 | 14.0 | — |
| modified sepiolite F5 | 8.6 | 10.4 | 26 |

For greater correctness, the quantity of magnesium was calculated on the samples after TGA, i.e. the only dry inorganic component thereof—respectively equal to 93.5% for the sepiolite sample F-SE and to 82.4% for the modified sepiolite F5—which was not decomposed by oxidative treatment at 800° C. As can be observed from the data in the table, the residual quantity of magnesium in the sample subjected to controlled acid treatment according to the comparative process (F5) is lower (10.4%) and equal to about 74% of the initial quantity. The acid treatment has therefore removed 26% of magnesium from the sepiolite fibres, preserving the original structure of the silicate, as demonstrated by the XRD spectrum of FIG. 6 and by the IR spectrum of FIG. 9A. The magnesium extraction data calculated according to this method on the powders is in optimal accordance with the complexometric data obtained on the filtration mother liquors.

Comparative Example 6

Preparation of Modified Sepiolite Fibres F6 (Aqueous Environment, Partial Extraction of Magnesium)

Modified sepiolite fibres were prepared by using the following materials:

| |
|---|
| sepiolite Pangel S9 (120 g) |
| 1M aqueous HCl (1.45 l) |
| Deionised water (2 l) |
| aqueous $NH_3$, 29% by weight |

Procedure 120 g of sepiolite Pangel S9 were loaded in a two-neck 3-litre flask, equipped with a mechanical stirrer. 1.45 l of 1M HO were added and the mixture was stirred for 60 minutes at 600 rpm at 23° C. and then filtered over Buchner. The solid was suspended in 2 l of deionised water. A solution of $NH_3$ at 29% by weight was then added until pH 7.0±0.2 is reached. The solid was collected over Buchner and washed with 1 l of deionised water and then it was dried in oven at 120° C. for 72 h.

From the XRF analysis of a product sample, 20% by weight of magnesium resulted extracted.

Upon microscopic observation (FIG. 4B) the sample maintained the needle-shaped morphology of the sepiolite fibres.

The IR analysis in the region 850-1300 $cm^1$ showed signals between 850 and 1040 $cm^1$ that were predominant with respect to those between 1040 and 1300 $cm^{-1}$, indication of the substantial maintenance of the crystalline structure.

Comparative Example 7

Preparation of Modified Sepiolite Fibres F7 (Alcoholic Environment, Presence of Non-Sulfur Silanising Agents, Partial Extraction of Magnesium)

Modified sepiolite fibres were prepared by using the following materials:

| |
|---|
| sepiolite Pangel S9 (sepiolite) supplied by Tolsa |
| $Me_2Si(EtO)_2$ dimethyldiethoxysilane, |
| isopropanol |
| 37% aqueous hydrochloric acid |
| solution of $NH_3$ at 29% by weight for the final neutralisation of the modified fibres, and deionised water for the washing. |

Procedure

In a reaction flask, 120 g of sepiolite were suspended in 1200 ml of isopropanol at 65° C. After 10 minutes of vigorous stirring (800 rpm, mechanical stirring), 35.6 g of $Me_2Si(EtO)_2$ were added, followed by 480 ml of 37% aqueous hydrochloric acid.

The mixture was held under stirring for 120 minutes at 65° C. and then filtered over Buchner. The solid was suspended in 2l of deionised water. Then, a solution of $NH_3$ at 29% by weight was added until pH 7.0±0.2 was reached. The solid was collected on Buchner, washed with 1 l of deionised water and dried in oven at 120° C. for 72 h.

From the XRF analysis of a product sample, 28% by weight of magnesium resulted extracted.

Upon microscopic observation, the sample maintained the morphology of the sepiolite fibres. The IR analysis in the region 850-1300 $cm^{-1}$ showed signals between 850 and 1040 $cm^1$ that were predominant with respect to those between 1040 and 1300 $cm^{-1}$, indication of the substantial maintenance of the crystalline structure

Example 8 (Invention)

Preparation of Sepiolite Fibres F8 with Needle-Shaped Morphology Modified by Acid Treatment with Controlled pH In a 3-litre reactor, 100 g of sepiolite Pangel S9 were suspended in 1500 ml of deionised water, at 70° C. under mechanical stirring (400 rpm). With an automatic meter driven by a pH-meter, 31 ml of aqueous 37% HCl were added over a period of 7 hours, at 70° C., maintaining the pH around 3.0±0.1. The suspension was then filtered, the solid filtered was then washed with deionised water up to pH 7 and dried in oven at 100° C. for 48 h.

From the XRF analysis of a product sample, 33.3% by weight of magnesium resulted extracted. Upon microscopic observation (FIG. 5), the sample maintained the morphology of the sepiolite fibres. The IR analysis (FIG. 10), in the region 850-1300 $cm^{-1}$ showed signals between 850 and 1040 $cm^{-1}$ that were predominant with respect to those between 1040 and 1300 $cm^{-1}$, indication of the substantial maintenance of the crystalline structure, data that is confirmed in the XRD analyses (FIG. 8) where the typical signals of the crystalline structure of the starting material are found.

By comparing the results obtained with the example 8 according to the present process with those of the comparative examples 1, 2a and 2b, which are marked by the initial addition of all the acid and by a pH of the medium much lower than 2, it is observed that the present process given the same solvent and with comparable temperature—allows effectively removing the magnesium from the fibres in the desired quantity (~33%) without having to terminate the reaction in brief times (10 minutes) as shown in the Comparative example 1, which is not very practical industrially, and without risking an excessive depletion of magnesium even after 7 hours of reaction, which is instead verified only after 70 minutes (~95%) in the case of the comparative example 2a.

Example 9 (Invention)

Figure 15:
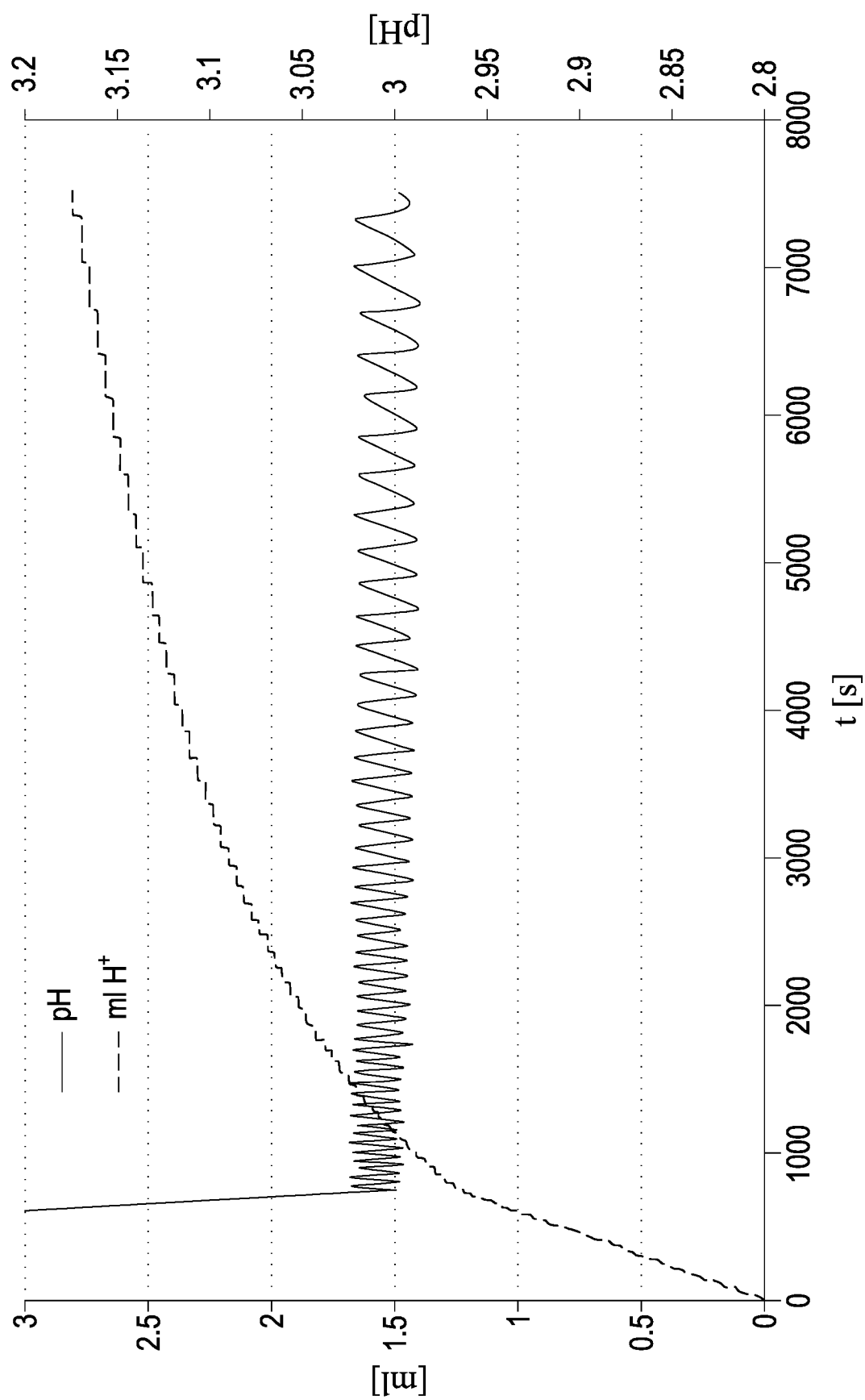
FIG. 15 reports the progression of the pH of the medium with the progression of the reaction during the gradual addition of the acid (ml of acid, indicated here as ml H+) according to the process of the present invention.

Preparation of Derivatised Sepiolite Fibres with Needle-Shaped Morphology F9 Modified by Acid Treatment with Controlled pH Microsample 6.81 g of derivatised sepiolite Pangel B5 (Tolsa, a sepiolite organically modified at the surface with a quaternary ammonium salt) was suspended in 135 ml of deionised water at 25° C. under magnetic stirring. 2.8 ml of 1M aqueous HCl was added over a period of 2 hours at 25° C., maintaining the pH at a value of 3.0±0.1. In FIG. 15, the acid volumes (ml HCl) added over time (t, seconds) are reported as well as the pH values measured in the reaction medium.

Macroscale

In a 3-litre reactor, 118 g of derivatised sepiolite Pangel B5 (Tolsa, a sepiolite organically modified at the surface with a quaternary ammonium salt) was suspended in 1500 ml of deionised water at 70° C. under mechanical stirring (400 rpm). 31 ml of aqueous 37% HCl were added over a period of 7 hours, at 70° C., maintaining the pH around 3.0±0.1.

The suspension was then filtered, the filtered solid was washed with deionised water until pH 7 was reached and dried in oven at 100° C. for 48 h.

From the XRF analysis of a product sample, 34.7% by weight of magnesium resulted extracted.

Upon microscopic observation, the sample maintained the needle-shaped morphology of the sepiolite fibres (FIG. 5).

The IR analysis (FIG. 10) between 850-1300 $cm^{-1}$, showed signals in the interval between 850 and 1040 $cm^{-1}$, that were predominant with respect to those between 1040 and 1300 $cm^{-1}$, indication of the substantial maintenance of the crystalline structure. This data is confirmed in the XRD analyses, where the crystalline structure of the starting material is found (FIG. 8).

Also in this example, where organically modified fibres are used as starting material, the same advantages reported for the process described in example 8 are confirmed. In particular, the process according to the invention has proven to be easily actuatable, even on industrial scale, with the use of normal steel apparatuses.

The following summary Table 2 reports the examples of preparation of the fibres, the quantity of extracted magnesium, the elastomeric materials in which the fibres were incorporated, with reference to the corresponding examples (green and vulcanised materials):

elastomeric material was unloaded. The sulfur and the accelerator (TBBS) were added and the mixing was carried out in an open roller mixer (2a step).

Example 10

Preparation of Standard (1) Vulcanisable Elastomeric Materials Comprising Modified Sepiolite Fibres The sepiolite fibres F1 modified as in the comparative example 1 were incorporated together with conventional silica SIL in standard compositions (1) for vulcanisable elastomeric materials for tyre components. These materials (MD) were compared with elastomeric comparative materials, comprising standard fillers, in particular only containing conventional silica (SIL in MA) or conventional silica together with non-modified sepiolite fibres (F-SE in MB) or conventional silica together with sepiolite fibres treated in more energetic acidic conditions (F2a in MC1) as in Comparative example 2a. In particular, in the materials (MB), (MC1) and (MD), 10 phr of conventional silica was substituted with 10 phr of non-modified sepiolite or sepiolite modified by drastic treatment or sepiolite modified by mild treatment, respectively.

The elastomeric materials of this example comprise standard compositions (1) suitable for many different applica-

TABLE 2

| | Fillers/Fibres | | % Mg extracted | Elastomeric material | Preparation green material | Preparation vulcanised material |
|---|---|---|---|---|---|---|
| Comp. | silica | SIL | — | Standard 1 | Ex. 10 MA | Ex. 14 V-MA |
| Comp. | silica | SIL | — | Internal app. | Ex. 11 ME1 | Ex. 15 V-ME1 |
| Comp. | silica | SIL | — | Internal app. | Ex. 11 ME2 | Ex. 15 V-ME2 |
| Comp. | silica | SIL | — | Tread1 | Ex. 12 ML1 | Ex. 16 V-ML1 |
| Comp. | silica | SIL | — | Tread2 | Ex. 12 ML2 | Ex. 16 V-ML2 |
| Comp. | sepiolite | F-SE | — | Standard 1 | Ex. 10 MB | Ex. 14 V-MB |
| Comp. | sepiolite | F-SE | — | Internal app. | Ex. 11 MF1 | Ex. 15 V-MF1 |
| Comp. | sepiolite | F-SE | — | Internal app. | Ex. 11 MF2 | Ex. 15 V-MF2 |
| Comp. | sepiolite | F-SE | — | Tread1 | Ex. 12 MM | Ex. 16 V-MM |
| Comp. | sepiolite | F-SE | — | Standard 2 | Ex. 13 MO | Ex. 17 V-MO |
| Comp. | Ex. 1 | F1 | 33% | Standard 1 | Ex. 10 MD | Ex. 14 V-MD |
| Comp. | Ex. 2a | F2a | 95% | Standard 1 | Ex. 10 MC1 | Ex. 14 V-MC1 |
| Comp. | Ex. 2b | F2b | 97% | Standard 1 | Ex. 11 MC2 | Ex. 15 V-MC2 |
| Comp. | Ex. 3 | F3 | 35% | Internal app. | Ex. 11 MG | Ex. 15 V-MG |
| Comp. | Ex. 4 | F4 | 35% | Internal app. | Ex. 11 MH | Ex. 15 V-MH |
| Comp. | Ex. 4 | F4 | 35% | Tread1 | Ex. 12 MN | Ex. 16 V-MN |
| Comp. | Ex. 5 | F5 | 26% | Internal app. | Ex. 11 MI | Ex. 15 V-MI |
| Comp. | Ex. 5 | F5 | 26% | Standard 2 | Ex. 13 MP | Ex. 17 V-MP |
| Comp. | Ex. 6 | F6 | 20% | Internal app. | Ex. 11 MJ | Ex. 15 V-MJ |
| Comp. | Ex. 7 | F7 | 28% | Internal app. | Ex. 11 MK | Ex. 15 V-MK |
| Inv. | Ex. 8 | F8 | 33% | Internal app. | Ex. 11 MQ | Ex. 15 V-MQ |
| Inv. | Ex. 9 | F9 | 35% | Internal app. | Ex. 11 MR | Ex. 15 V-MR |
| Inv. | Ex. 8 | F8 | 33% | Tread2 | Ex. 12 MS | Ex. 16 V-MS |
| Inv. | Ex. 9 | F9 | 35% | Tread2 | Ex. 12 MT | Ex. 16 V-MT |

Preparation of the Elastomeric Materials (M)

The vulcanisable elastomeric materials of the following examples were prepared according to the modes described herein. The quantities of the various components are indicated in phr.

All the components, except for the sulfur and the vulcanisation accelerator (TBBS), were mixed in an internal mixer (Brabender or Banbury) for about 5 minutes (1a step). As soon as the temperature has reached 145° C.±5° C., the tions, such as elastomeric materials for under-layer (car and heavy vehicles), soft bead (heavy vehicles), sidewall insert (car), or sidewall and are similar to formulations for tread (heavy vehicles). Hence, the results showed by these elastomeric materials are representative of those obtainable with elastomeric materials for tyre components filled with silica or with silica and carbon black in general.

The following Table 3 reports the compositions in phr of the comparative vulcanisable elastomeric materials (MA), (MB), (MC1) and (MD):

TABLE 3

| | Comparative example 10 | | | |
|---|---|---|---|---|
| | MA Comp. | MB Comp. | MC1 Comp. | MD Comp. |
| Filler | Silica | Silica + sepiolite | Silica + modified sepiolite (Ex. 2a) | Silica + modified sepiolite (Ex. 1) |
| % Mg extracted | — | — | 95% | 33% |
| Zeosil 1115MK | 45 | 35 | 35 | 35 |
| sepiolite | 0 | 10 | 0 | 0 |
| modified sepiolite Ex. 2a | 0 | 0 | 10 | 0 |
| modified sepiolite Ex. 1 | 0 | 0 | 0 | 10 |
| NR | 100 | 100 | 100 | 100 |
| Stearic acid | 2 | 2 | 2 | 2 |
| Silane TESPT | 3.6 | 3.6 | 3.6 | 3.6 |
| ZnO | 3.6 | 3.6 | 3.6 | 3.6 |
| 6-PPD | 2 | 2 | 2 | 2 |
| TBBS | 1.8 | 1.8 | 1.8 | 1.8 |
| Sulfur | 2.8 | 2.8 | 2.8 | 2.8 | in which NR (natural rubber): natural rubber; TESPT: Bis[3-(triethoxysilyl)propyl]tetrasulphide; Zeosil 1115MK: precipitated synthetic amorphous silica (Rhodia); sepiolite: Pangel S9; ZnO: zinc oxide; 6-PPD: N-(1,3-Dimethylbutyl)-N'-phenyl-p-phenylenediamine; TBSS: N-tert-butyl-2-benzothiazylsulfenamide.

Example 11

Preparation of Vulcanisable Elastomeric Materials for Internal Applications Comprising Modified Sepiolite Fibres The sepiolite fibres F2b, F3, F4, F5, F6 and F7, modified as in Comparative examples 2b, 3, 4, 5, 6 and 7, and the fibres F8, F9 as in examples of the invention 8 and 9, were incorporated together with carbon black and conventional silica in compositions for vulcanisable elastomeric materials for internal tyre components such as sidewall insert, bead or under-liner. These comparative materials (MC2), (MG), (MH), (MI), (MJ) and (MK), and (MQ) and (MR) of the invention, were compared with the same elastomeric materials comprising standard fillers (comparative), in particular containing only carbon black and conventional silica (ME1) or carbon black and conventional silica together with non-modified sepiolite fibres (MF1).

The mixing was conducted in three steps by using an internal mixer with tangential rotors (Pomini PL 1.6): in the first step, the polymers, the fillers and the silane were introduced and the mixing was continued for 4-5 minutes, up to reaching 135° C.±5° C., when the composition was unloaded. After 12-24 hours, in the second step, conducted using the same mixer, ZnO, TMQ and 6-PPD were introduced and the mixing was continued for about 3 minutes, up to reaching 125° C.±5° C., when the composition was unloaded. After 12-24 hours, in the third step, conducted using the same mixer, TBBS and sulfur were introduced and the mixing was conducted for about 2 minutes, up to reaching 95° C.±5° C., when the composition was unloaded.

The following Table 4a reports the compositions in phr of the comparative vulcanisable elastomeric materials (ME1), (MF1), (MC2), (MG), (MH), (MI), (MJ) and (MK):

TABLE 4a

| | comparatives | | | | | | | |
|---|---|---|---|---|---|---|---|---|
| | Example 11 | | | | | | | |
| | ME1 Comp. | MF1 Comp. | MC2 Comp. | MG Comp. | MH Comp. | MI Comp. | MJ Comp. | MK Comp. |
| Filler | Silica | Silica + sepiolite | Silica + mod. sepiolite (Ex. 2b) | Silica + mod. sepiolite (Ex. 3) | Silica + mod. sepiolite (Ex. 4) | Silica + mod. sepiolite (Ex. 5) | Silica + mod. sepiolite (Ex. 6) | Silica + mod. sepiolite (Ex. 7) |
| % Mg extracted | — | — | 97% | 35% | 35% | 26% | 20% | 28% |
| CB N550 | 25 | 25 | 25 | 25 | 25 | 25 | 25 | 25 |
| ZEOSIL 1115 MK | 30 | 20 | 20 | 20 | 20 | 20 | 20 | 20 |
| sepiolite | — | 7 | — | — | — | — | — | — |
| mod. sepiolite Ex. 2b | — | — | 7 | — | — | — | — | — |
| mod. sepiolite Ex. 3 | — | — | — | 8.29 | — | — | — | — |
| mod. sepiolite Ex. 4 | — | — | — | — | 9.79 | — | — | — |
| mod. sepiolite Ex. 5 | — | — | — | — | — | 8.55 | — | — |
| mod. sepiolite Ex. 6 | — | — | — | — | — | — | 8.55 | — |
| mod. sepiolite Ex. 7 | — | — | — | — | — | — | — | 8 |
| BR (Nd) | 60 | 60 | 60 | 60 | 60 | 60 | 60 | 60 |
| IR | 40 | 40 | 40 | 40 | 40 | 40 | 40 | 40 |
| Silane | 5 | 5 | 5 | 5 | 5 | 5 | 5 | 5 |
| Stearic acid | 1 | 1 | 1 | 1 | 1 | 1 | 1 | 1 |
| ZnO | 4 | 4 | 4 | 4 | 4 | 4 | 4 | 4 |
| TMQ | 1 | 1 | 1 | 1 | 1 | 1 | 1 | 1 |
| 6-PPD | 1.5 | 1.5 | 1.5 | 1.5 | 1.5 | 1.5 | 1.5 | 1.5 |
| TBBS 80 | 4 | 4 | 4 | 4 | 4 | 4 | 4 | 4 |
| Sulfur | 2.3 | 2.3 | 2.3 | 2.3 | 2.3 | 2.3 | 2.3 | 2.3 | in which BR(Nd): (high cis) neodymium polybutadiene rubber (Europrene 40 Versalis); IR: synthetic polyisoprene (SK13 produced by Nitzhnekamsk); silane: 50% TESPT: Bis[3-(triethoxysilyl)propyl]tetrasulphide on carbon black; CB: carbon black; Zeosil 1115MK: precipitated synthetic amorphous silica (Rhodia); sepiolite: Pangel S9 (Tolsa); ZnO: zinc oxide; TMQ: polymerised 2,2,4-trimethyl-1,2-dihydroquinoline; 6-PPD: N-(1,3-Dimethylbutyl)-N'-phenyl-p-phenylenediamine;

TBSS: N-tert-butyl-2-benzothiazyl sulfenamide.

In the comparative material (MF1), 7 parts sepiolite substituted 10 parts silica.

In the comparative material (MC2), 7 parts modified sepiolite substituted 10 parts silica, as described in example 2b.

In the case instead of the comparative materials (MG), (MH), (MI), (MJ) and (MK), the quantity of modified sepiolite to be added, always in substitution of 10 phr of silica, was calculated by considering the weight loss of the samples in the TGA, so as to add a quantity of modified fibres corresponding to 7 phr of dry inorganic component, with the objective of obtaining blends that had comparable hardness. The following Table 4b reports the compositions in phr of the vulcanisable elastomeric materials according to the invention (MQ) and (MR), with respect to the comparative materials (ME2) and (MF2):

TABLE 4B

| | Example 11 | | | |
|---|---|---|---|---|
| | ME2 Comp. | MF2 Comp. | MQ Inv. | MR Inv. |
| Filler | Silica | Silica + Sepiolite | Silica + mod. sepiolite (Ex. 8) | Silica + mod. sepiolite (Ex. 9) |
| % Mg extracted | — | — | 33% | 35% |
| CB N550 | 25 | 25 | 25 | 25 |
| ZEOSIL 1115 MK | 30 | 20 | 20 | 20 |
| Sepiolite | — | 7 | — | — |
| mod. sepiolite Ex. 8 | — | — | 7.5 | — |
| mod. sepiolite Ex. 9 | — | — | — | 8.5 |
| BR (Nd) | 60 | 60 | 60 | 60 |
| IR | 40 | 40 | 40 | 40 |
| Silane TESPT | 5 | 5 | 5 | 5 |
| Stearic acid | 1 | 1 | 1 | 1 |
| ZnO | 4 | 4 | 4 | 4 |
| TMQ | 1 | 1 | 1 | 1 |
| 6-PPD | 1.5 | 1.5 | 1.5 | 1.5 |
| TBBS 80 | 4 | 4 | 4 | 4 |
| Sulfur | 2.0 | 2.0 | 2.0 | 2.0 |

The comparative compositions ME2 and MF2 differ from the compositions ME1 and MF1 reported in the preceding Table 4a due to the lower sulfur content.

These compositions are technical blends of sidewall filler type. In the samples MF2, MQ and MR, 10 phr of silica was substituted with 7, 7.5 or 8.5 phr of sepiolite, of modified sepiolite as described in the examples 8 and 9 of the invention, respectively. The quantities used in the compositions (MQ) and (MR) of the modified materials according to the invention were calculated based on the TGA of the modified materials described in examples 8 and 9, as illustrated above for the compositions (MG), (MH), (MI), (MJ) and (MK).

Example 12

Preparation of Vulcanisable Elastomeric Materials for Tread Applications Comprising Modified Sepiolite Fibres The sepiolite fibres F4 modified as in the comparative example 4 (controlled acid treatment in presence of silanising agents) and the fibres modified according to the process of the invention of examples 8 and 9 (F8 and F9) were incorporated together with conventional silica in compositions for vulcanisable elastomeric materials for tread (here named tread1). These materials (MN comparative, MS and MT according to the invention) were compared with elastomeric materials comprising standard fillers, in particular containing only conventional silica (SIL in ML1) or conventional silica together with non-modified sepiolite fibres (F-SE in MM).

The mixing was conducted in three steps by using an internal mixer with tangential rotors (Pomini PL 1.6): in the first step, the polymers, the fillers, the silane, the stearic acid and the TDAE oil were introduced and the mixing was continued for 4-5 minutes, up to reaching 140° C.±5° C., when the composition was unloaded. After 12-24 hours, in the second step, conducted using the same mixer, ZnO and 6-PPD were introduced and the mixing was continued for about 3 minutes, up to reaching 125° C.±5° C., when the composition was unloaded. After 12-24 hours, in the third step, conducted using the same mixer, TBBS, TBZTD and sulfur were introduced and the mixing was conducted for about 2 minutes, up to reaching 95° C.±5° C., when the composition was unloaded.

The following Table 5a reports the compositions in phr of the comparative vulcanisable elastomeric materials (ML1), (MM) and (MN):

TABLE 5a

| | comparatives | | |
|---|---|---|---|
| | Example 12 | | |
| | ML1 Comp. | MM Comp. | MN Comp. |
| Filler | Silica | Silica + sepiolite | Silica + modified sepiolite (Ex. 4) |
| % Mg extracted | — | — | 35% |
| ZEOSIL 1165 MK | 85 | 75 | 75 |
| Sepiolite | — | 7 | — |
| mod. sepiolite Ex. 4 (silane) | — | — | 9.79 |
| BR (Nd) | 27 | 27 | 27 |
| S-SBR | 100 | 100 | 100 |
| SI 69 | 6.8 | 6.8 | 6 |
| Stearic acid | 2 | 2 | 2 |
| TDAE olio | 13 | 13 | 13 |
| ZnO | 2.4 | 2.4 | 2.4 |
| 6-PPD | 3.5 | 3.5 | 3.5 |
| TBBS | 2.5 | 2.5 | 2.5 |
| TBZTD | 0.5 | 0.5 | 0.5 |
| Sulfur | 1 | 1 | 1 | in which BR(Nd): (high cis) neodymium polybutadiene rubber (Europrene 40 Versalis); S-SBR styrene-butadiene rubber SLR 4630 (oil extended, contained in elastomer 73 phr) by Styron Europe GmbH; SI 69: liquid Bis[3-(triethoxysilyl)propyl]tetrasulphide (Evonik) Zeosil 1165MK: precipitated synthetic amorphous silica (Rhodia); sepiolite: Pangel S9 (Tolsa); TDAE: distilled aromatic oil; ZnO: zinc oxide; 6-PPD: N-(1,3-Dimethylbutyl)-N'-phenyl-p-phenylenediamine; TBSS: N-tert-butyl-2-benzothiazyl-sulfenamide; TBZTD: tetrabenzyl thiuram disulphide.

In the material (MM), 7 parts sepiolite substituted 10 parts silica.

In the case instead of the material (MN), the quantity of modified sepiolite to be added, always in substitution of 10 phr of silica, was calculated by considering the weight loss of the samples in the TGA, loss corresponding to the organic portion, which in the ramp up to 800° C. was 28.5%, so as to add a quantity of modified fibres corresponding to 7 phr of dry inorganic component, with the objective of obtaining blends which had comparable hardness.

The following Table 5b reports the compositions in phr of the vulcanisable elastomeric materials (named tread 2), comparative (ML2) and invention (MS) and (MT):

TABLE 5b

|  | Example 12 | | |
| --- | --- | --- | --- |
|  | ML2 Comp. | MS Inv. | MT Inv. |
| Filler | Silica | Silica + modified sepiolite (Ex. 8) | Silica + modified sepiolite (Ex. 9) |
| % Mg extracted | — | 33% | 35% |
| ZEOSIL 1165 MK | 85 | 55 | 55 |
| mod. sepiolite Ex. 8 | — | 15 | — |
| mod. sepiolite Ex. 9 | — | — | 17 |
| BR (Nd) | 27 | 27 | 27 |
| S-SBR | 100 | 100 | 100 |
| SI 69 | 8 | 8 | 8 |
| Stearic acid | 2 | 2 | 2 |
| Microcrystalline max | 2 | 2 | 2 |
| TDAE oil | 5 | 5 | 5 |
| N-Octylpyrrolidone | 2.5 | 2.5 | 2.5 |
| ZnO | 3 | 3 | 3 |
| TMQ | 1.75 | 1.75 | 1.75 |
| 6-PPD | 3 | 3 | 3 |
| TBBS 80 | 2.5 | 2.5 | 2.5 |
| Sulfur | 1.4 | 1.4 | 1.4 | in which microcrystalline wax: mixture of N-paraffins, Riowax BNO1 of SER S.P.A. (ozone protection); TMQ: 2,2,4-Trimethyl-1,2-Dihydrquinoline, Rubatan 184 General Quimica SA (Antioxidant); N-Octylpyrrolidone is Surfadone LP 100 of BASF; for the other ingredients reference is made to the key of table 5a.

These compositions are technical blends of tread type. In the examples MS, and MT, 30 phr of silica were substituted with 15 or 17 phr of modified sepiolite as described in the examples 8 and 9 of the invention, respectively.

Example 13

Preparation of standard (2) elastomeric materials comprising modified sepiolite fibres Sepiolite fibres F5 modified as in Comparative example 5 (controlled acid treatment in the presence of silanising agents) (36.4 phr) were incorporated as single filler in a standard composition (2) for vulcanisable elastomeric materials. This comparative material (MP) was compared with the comparative material comprising non-modified sepiolite fibres (MO).

The following Table 6 reports the compositions in phr of the comparative vulcanisable elastomeric materials (MO) and (MP):

TABLE 6

|  | Example 13 | |
| --- | --- | --- |
|  | MO Comp. | MP Comp. |
| Filler | sepiolite | modified sepiolite (Ex. 5) |
| % Mg extracted | — | 26% |
| sepiolite Pangel S9 | 35 | — |
| mod. sepiolite Ex. 5 | — | 36.4 |

TABLE 6-continued

|  | Example 13 | |
| --- | --- | --- |
|  | MO Comp. | MP Comp. |
| S-SBR | 100 | 100 |
| TESPD | 2.8 | — |
| Stearic acid | 0.85 | 0.85 |
| ZnO | 2.7 | 2.7 |
| 6-PPD | 1 | 1 |
| Sulfur | 2 | 2 |
| CBS | 1.5 | 1.5 | in which S-SBR: styrene-butadiene rubber SLR 4630 by Styron Europe GmbH; TESPD: Bis (3-triethoxysilylpropyl) disulphide by Aldrich; 6-PPD: N-(1,3-Dimethylbutyl)-N'-phenyl-p-phenylenediamine Santoflex-6 PPD by Flexsys; stearic acid: Stearina TP8 by Undesa; Sulfur: S8 (soluble sulfur) by Zolfo industria; ZnO: zinc oxide by Zincol Ossidi; CBS: N-cyclohexyl-2-benzothiazolsulfenamide Vulkacit CZ/C by Lanxess.

Figure 12A:
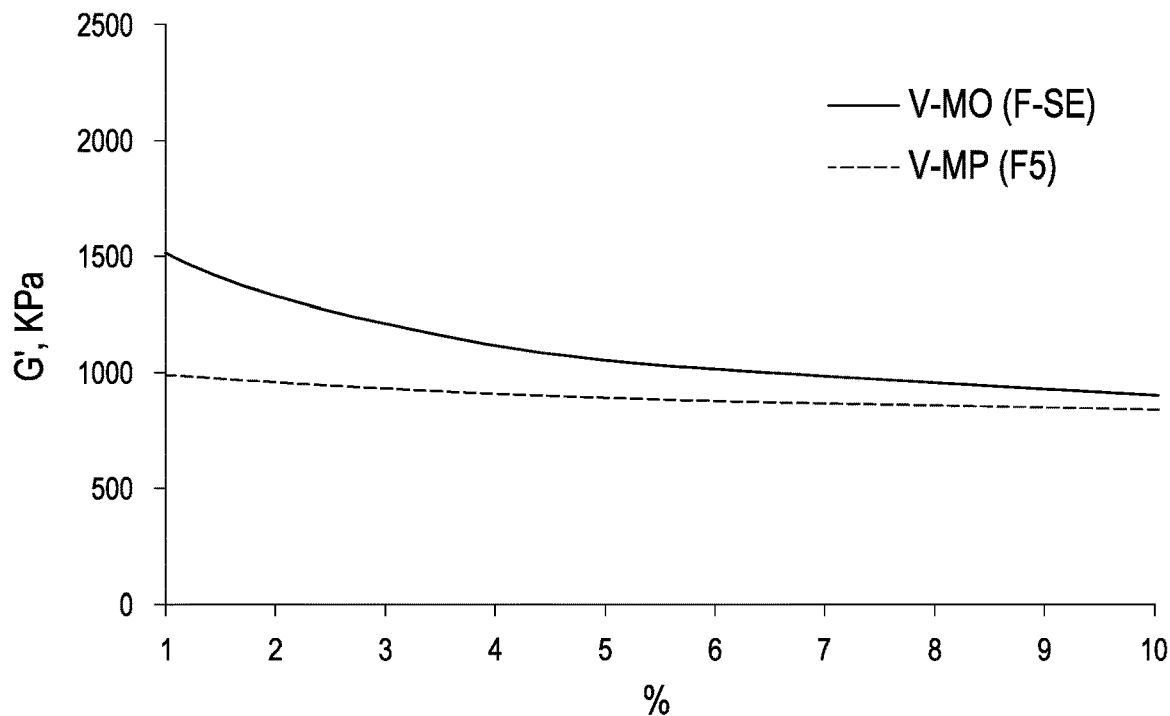
FIG. 12 (A and B) reports the progression of the dynamic elastic modulus and of the tan delta with increasing deformations of samples of elastomeric materials comprising non-modified sepiolite fibres F-SE (V-MO) and sepiolite fibres F5 modified as in the comparative example 5 (V-MP).

FIG. 12A reports the progression of the modulus G' for these materials (see Example 17 for a detailed comment).

Preparation and Characterisation of the Vulcanised Elastomeric Materials

The elastomeric materials prepared in the preceding examples were vulcanised to give rise to specimens on which analytical characterisations were carried out together with the evaluation of the static and dynamic mechanical properties.

The vulcanisation, unless otherwise indicated, was conducted in a mould, in a hydraulic press at 170° C. and at the pressure of 200 bar for a time of about 10 minutes In the present description, the vulcanised samples were named with the same initials as the original elastomeric green material preceded by the letter V (for example, from the material MK, the specimen of vulcanised material named V-MK derives).

The static mechanical properties were measured according to the standard ISO 37:2005 at different extensions (50%, 100%, 300°/0), on samples of the vulcanised elastomeric materials at 170° C. for 10 minutes. The traction tests were carried out on Dumbbell specimens.

The dynamic mechanical properties were evaluated by using a rheometer Monsanto R.P.A. 2000 according to the following method: cylindrical test samples with weights in the range from 4.5 g to 5.5 g were obtained by means of punching the vulcanisable elastomeric composition of the samples and their vulcanisation in the instrument "RPA" (at 170° C. for 10 minutes). The vulcanised samples were subjected to the measurement of the dynamic elastic shear modulus (G') at 70° C., frequency 10 Hz, deformation from 0.1% to 10%.

The Payne effect was evaluated through the difference between the shear moduli (G') at 10% and at 0.5% except where otherwise indicated.

In addition, the dynamic compression moduli were measured using a dynamic device Instron in the compression mode according to the following methods. A test piece of vulcanised material having a cylindrical shape (length=25 mm; diameter=14 mm), preloaded with compression up to a longitudinal deformation of 25% with respect to the initial length and maintained at the preset temperature (23° C. or 70° C.) for the entire duration of the test, was subjected to a dynamic sinusoidal stress having an amplitude of ±3.5% with respect to the length under preload, with a frequency of 100 Hz.

The dynamic mechanical properties were expressed in terms of values of dynamic elastic modulus (E') and Tan delta (loss factor).

The value Tan delta was calculated as ratio between the viscous dynamic modulus (E") and the elastic dynamic modulus (E'), both being determined with the abovementioned dynamic measurements.

le;.4qThe generation of heat and the bending fatigue during the compression were measured by means of a Goodrich flexometer according to ASTM D 623-07. The test consisted of subjecting a rubber sample of defined size and shape to compression stresses by means of quick oscillation in controlled conditions. The increase of the temperature was measured. In particular, the increase of the temperature was measured up to an equilibrium temperature.

In this method, a defined compression load is applied on a test sample through a lever system having high inertia, simultaneously imposing on the sample an additional high frequency cyclic compression with defined amplitude. The increase of the temperature at the base of the test sample is measured with a thermocouple in order to supply an indication relative to the heat generated during the bending of the sample.

The standard test sample was moulded, a cylinder having a diameter of 17.8 mm and a height of 25 mm.

The test conditions were: excursion=6.35 mm; load (on beam)=216 N; time=30 minutes; temperature=23° C. The test was terminated after 30 minutes, time at which the final internal temperature of the sample was determined.

Example 14 (Standard 1 Vulcanised Elastomeric Materials)

The elastomeric comparative materials (MA), (MB), (MC1) and (MD) prepared in example 10 and vulcanised at 170° C. for 10 minutes were subjected to measurement of the static and dynamic mechanical properties according to the previously described methods—except for the dynamic deformation interval from 0.4% to 35% in the shear test (G'), conducted with the instrument "RPA", rather than 0.1%-10%. The following Table 7 reports the values measured for the four comparative samples:

TABLE 7

| | example 14 | | | |
|---|---|---|---|---|
| | V-MA Comp. | V-MB Comp. | V-MC1 Comp. | V-MD Comp. |
| Filler | Silica | Silica + sepiolite modified | Silica + sepiolite Ex. 2a | Silica + modified sepiolite Ex. 1 |
| % Mg extracted | — | — | 80% | 33% |
| Ca0.1 [MPa] | 0.48 | 0.62 | 0.42 | 0.50 |
| Ca0.5 [MPa] | 1.45 | 2.47 | 1.23 | 1.67 |
| Ca1 [MPa] | 2.91 | 5.63 | 2.48 | 3.79 |
| Ca3 [MPa] | 16.76 | 18.50 | 12.69 | 16.68 |
| CR [MPa] | 21.57 | 23.39 | 22.83 | 21.94 |
| AR [%] | 361.05 | 371.34 | 462.04 | 376.85 |
| G' (0.4%) [MPa] | 1.51 | 1.48 | 1.21 | 1.31 |

TABLE 7-continued

| | example 14 | | | |
|---|---|---|---|---|
| | V-MA Comp. | V-MB Comp. | V-MC1 Comp. | V-MD Comp. |
| ΔG'(0.4-35%)/G' 0.4% | 0.30 | 0.31 | 0.27 | 0.27 |
| max Tan delta | 0.071 | 0.074 | 0.082 | 0.071 |

From the analysis of the data reported in Table 7, it is inferred that by substituting an aliquot of silica in an elastomeric standard composition (1) (V-MA) with equivalent weight of non-modified sepiolite fibres F-SE, an elastomeric material (V-MB) is obtained with greater reinforcement but worsened hysteresis and Payne effect (see tan delta and ΔG'(0.4-35%)/G' (0.4%).

By employing modified sepiolite fibres for drastic acid treatment F2a (comparative V-MC1, prepared in the comparative example 2a, with extraction of the magnesium of 95% and loss of the crystalline structure and of the needle-shaped morphology), a worsening is observed both of the static properties and above all of the hysteresis (higher tan delta).

By incorporating modified sepiolite fibres F1 in the elastomeric material according to comparative acid treatment processes, with addition of all the acid at the start and pH of the medium lower than 2 (V-MD), a hysteresis is observed that is lower than that of the material comprising non-treated sepiolite (V-MB) and comparable to that of the material comprising only silica (V-MA) but with significant improvement of the Payne effect and satisfactory static properties.

A very advantageous elastomeric composition is thus obtained, with comparable hysteresis but with reduced Payne effect with respect to the elastomeric standard material 1 (V-MA).

In addition, as can be seen from the data in Table 7, the sepiolite fibres treated in drastic acidic conditions F2a (as in the comparative example 2a) and incorporated in these elastomeric reference materials (V-MC1) involve a static reinforcement lower than that of the commercial silica (V-MA), and a much higher hysteresis (tan delta of 0.082 with respect to 0.071): it is particularly surprising that both the starting non-modified sepiolite (V-MB) and the product of the exhaustive reaction with acid (V-MC1) both induce higher hysteresis in the materials, while the sepiolite modified by comparative acid treatment F1 determines a hysteresis of the comparative material (V-MD) lower than both reference materials.

Example 15 (Vulcanised Elastomeric Materials for Internal Applications)

The elastomeric comparative materials (ME1), (MF1), (MC2), (MG), (MH), (MI), (MJ) and (MK) prepared in example 11 and vulcanised at 170° C. for 10 minutes were subjected to measurement of the static and dynamic mechanical properties according to the previously-described methods. The following Table 8a reports the values measured for the eight comparative samples:

TABLE 8a

| | example 15 | | | | | | | |
|---|---|---|---|---|---|---|---|---|
| | V-ME1 Comp. | V-MF1 Comp. | V-MC2 Comp. | V-MG Comp. | V-MH Comp. | V-MI Comp. | V-MJ Comp. | V-MK Comp. |
| Filler | Silica | Silica + sepiolite | Silica + mod. sepiolite Ex. 2b | Silica + mod. sepiolite Ex. 3 | Silica + mod. sepiolite Ex. 4 | Silica + mod. sepiolite Ex. 5 | Silica + mod. sepiolite Ex.6 | Silica + mod. sepiolite Ex. 7 |
| % Mg extracted | — | — | 97% | 35% | 35% | 26% | 20% | 28% |
| Ca0.5 [MPa] | 2.34 | 2.48 | 2.00 | 2.51 | 2.47 | 2.28 | 2.60 | 2.60 |
| Ca1[MPa] | 4.90 | 5.47 | 4.04 | 5.44 | 5.42 | 4.96 | 5.64 | 5.75 |
| CR[MPa] | 11.6 | 14.70 | 11.9 | 12.27 | 12.58 | 13.69 | 12.10 | 14.24 |
| AR[%] | 198.4 | 242.87 | 266.1 | 199.70 | 191.99 | 228.64 | 215.32 | 182.94 |
| IRHD 23° C. | 72.7 | 72.9 | 72.5 | 72.4 | 73.2 | 72.3 | 75.5 | 75.6 |
| IRHD 100° C. | 70.9 | 71.6 | 71.4 | 71.7 | 72.1 | 70.5 | 74.3 | 74.6 |
| E' [MPa] 23° C. 100 Hz | 8.41 | 8.65 | 7.97 | 8.55 | 8.65 | 8.36 | 9.49 | 9.16 |
| E' [MPa] 70° C. 100 Hz | 8.44 | 8.60 | 8.02 | 8.65 | 8.66 | 8.46 | 9.56 | 9.15 |
| Tan Delta 23° C. 100 Hz | 0.094 | 0.101 | 0.097 | 0.075 | 0.074 | 0.093 | 0.082 | 0.084 |
| Tan Delta 70° C. 100 Hz | 0.066 | 0.070 | 0.066 | 0.052 | 0.050 | 0.065 | 0.056 | 0.058 |
| G' 70° C. (9%) MPa | 1.69 | 1.59 | 1.63 | 1.64 | 1.64 | 1.57 | 1.74 | 1.75 |
| Tan Delta 70° C. (9%) | 0.101 | 0.112 | 0.095 | 0.095 | 0.092 | 0.097 | 0.102 | 0.098 |
| dG'(0.5-10) MPa Goodrich | 1.0 | 1.1 | 0.8 | 0.9 | 0.9 | 0.9 | 1.0 | 0.9 |
| Final internal Temp. ° C. | 127.3 | 135.0 | 131.1 | 115.4 | 119.0 | 124.0 | 126.0 | 126.5 |
| Permanent deformation | −2.3 | −2.9 | −2.3 | −1.4 | −1.9 | −1.9 | −2.0 | −2.0 |

From the analysis of the data reported in Table 8a, it is inferred that by substituting an aliquot of silica in a conventional elastomeric composition (V-ME1) with 70% by weight of non-modified sepiolite F-SE, an elastomeric material (V-MF1) is obtained with greater static reinforcement and greater tensile properties, but the following are increased: the hysteresis—measured as tan delta at 70° C. both under compression and shear—the Payne effect measured as difference of elastic shear modulus at 70° C. between 0.5% and 10% of dynamic deformation—and heat generation—measured by the Goodrich test, as well as the permanent deformation measured at the end of the Goodrich test.

By employing sepiolite fibres modified by drastic acid treatment F2b (comparative V-MC2, prepared in example 2b, with extraction of the magnesium of 97%, loss of the crystalline structure and preservation of the needle-shaped morphology), the following is observed: a worsening of the static mechanical properties, measured by means of the parameters Ca0.5, Cal and CR, together with a worsening of the dynamic mechanical properties measured by means of the parameter E', both with regard to the elastomeric reference materials V-ME1 and V-MF1 and with regard to all the samples of the elastomeric comparative materials reported in table 8a. Such worsening indicates a lower reinforcement capacity of these fibres modified with drastic acid treatment.

From the Goodrich test, one also observes a final internal temperature higher than that of the sample comprising silica (V-ME1) and that of all the comparative samples comprising modified sepiolite (V-MG, V-MH, V-MI, V-MJ, V-MK), indicating that, disadvantageously, the material V-MC2 develops more heat during use.

Finally, also the permanent deformation of the sample V-MC2 is higher with respect to the comparative samples.

Instead, by incorporating in the elastomeric material, in substitution of an aliquot of silica, sepiolite fibres modified according to a comparative acid treatment, with removal of 35% of the magnesium, in the absence of (F3 in V-MG) or in the presence of sulfur silanising agents (F4 in V-MH), the same static and dynamic reinforcement capacity of the non-modified sepiolite is substantially maintained, and the thermoplasticity measured as hardness delta is further improved, though above all the dissipative properties are improved, measured as Tan Delta both in the compression test and in the shear test.

In the case of the comparative samples V-MG and V-MH, the tan delta at 70° C. is lower in the compression test by over 25% due to the improved hysteresis conferred by the modified sepiolite fibres F3 and F4. This result is interesting if it is considered that the composition has been modified by less than 6% by weight.

In order to further investigate the dissipative behaviour of the materials, flexometry measurements were conducted according to Goodrich. This characterisation technique is particularly important for evaluating compounds with different hysteretic properties. The test is conducted according to ASTM D 623-07 in conditions similar to the dynamic compression tests, but continuing the test for 30 minutes, setting a fixed preload and dynamic deformation, with the further possibility of measuring the temperature of the samples at the end of the test. In this manner, one obtains an indication of the heat dissipated by the material under examination, during the compression deformation step, which is directly correlated to its hysteretic behaviour and to its modulus: the higher the modulus and hysteresis, the higher the final temperature.

Table 8a reports the values of the final temperatures: it can be observed that the comparative samples with sepiolite V-MF1 and V-MC2 are heated by about 8° C. and 4° C. more than the comparative sample V-ME1, while the comparative sample V-MH is heated 8° C. less than the comparative example V-ME1 and therefore respectively 16° C. and 12° C. less than the corresponding V-MF1 and V-MC2, given the same dynamic modulus. In the case of the comparative V-MG the temperature difference is 20° C. with respect to V-MF1 and 16° C. with respect to V-MC2.

A significant improvement is also observed regarding the permanent deformation measured at the end of the Goodrich test.

The comparative sample (V-MJ) comprising fibres in which the removal of the magnesium, with a quick procedure in water, was 20% (F6), showed excellent static and dynamic reinforcement properties, greater than those of the sample with non-modified sepiolite, maintaining a hysteresis that is reduced both with respect to the elastomeric comparative material V-MF1 and with respect to the elastomeric comparative material with silica V-ME1. Also the behaviour at the Goodrich test confirms an improved dynamic behaviour, leading to a final temperature that is lower than that of the references, notwithstanding the very high reinforcement level.

Considerations analogous to those for the sample V-MJ can be made for the comparative sample V-MK, comprising fibres in which the removal of the magnesium, with a procedure in alcohol with a non-sulfur silanising agent, was 28%.

The comparative sample comprising fibres in which the removal of the magnesium was 26% (F5 in V-MI), through a process in isopropanol-water, with 37% hydrochloric acid, in the presence of TESPT and over long times, showed excellent tensile properties, improved with respect to the comparative without sepiolite V-ME1, maintaining similar static and dynamic reinforcement properties, with a decreased hysteresis and Payne effect, as also shown by the behaviour at the Goodrich test, which leads to a final temperature that is lower with respect to the references, as well as a smaller permanent deformation measured at the end of the Goodrich test itself.

Figure 13:
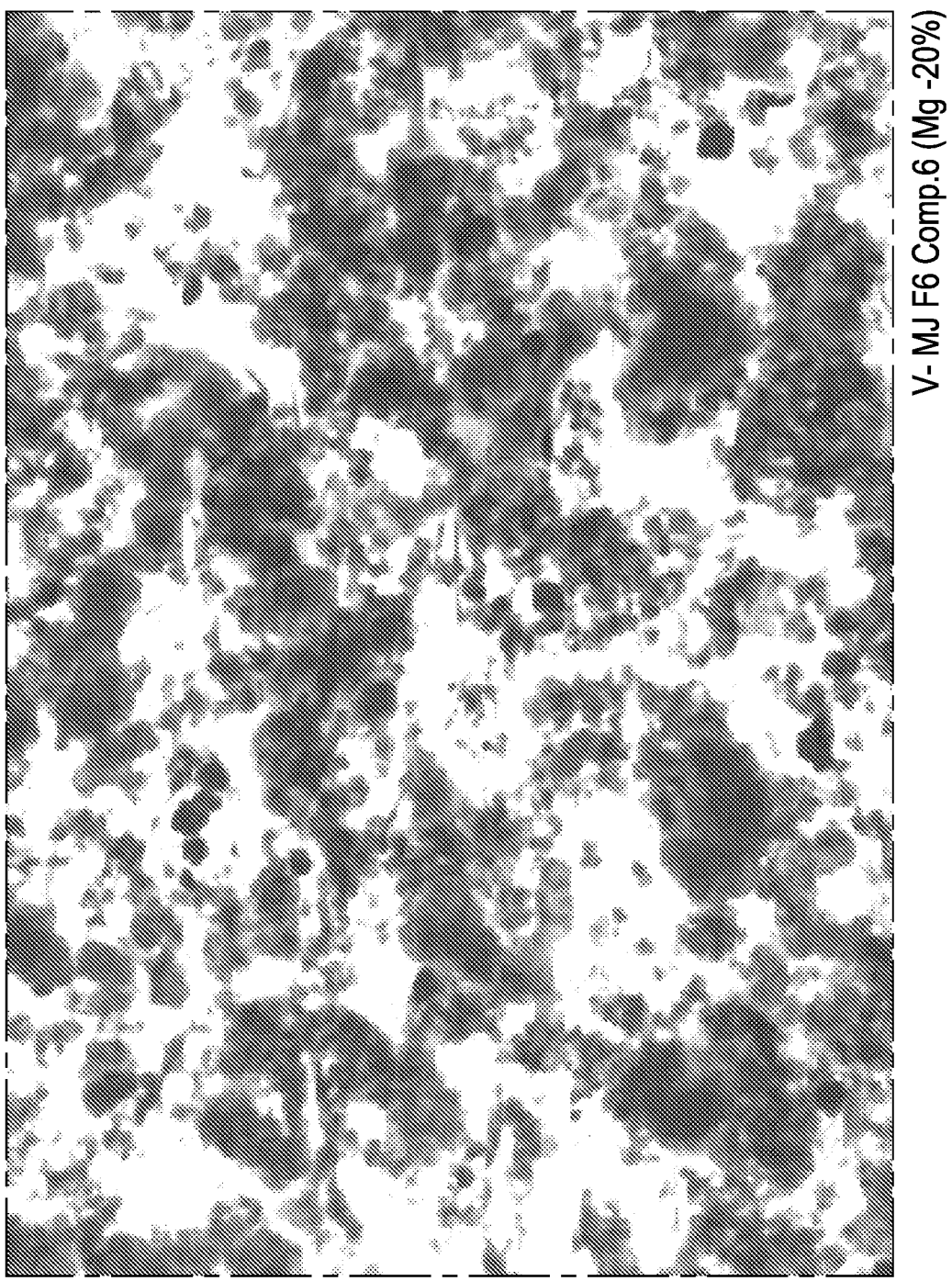
FIG. 13 is the STEM image (Scanning Transmission Electron Microscopy) of a thin section of a vulcanised elastomeric composition (V-MJ Example 15) comprising the modified sepiolite fibres F6 according to the comparative example 6.
Figure 14:
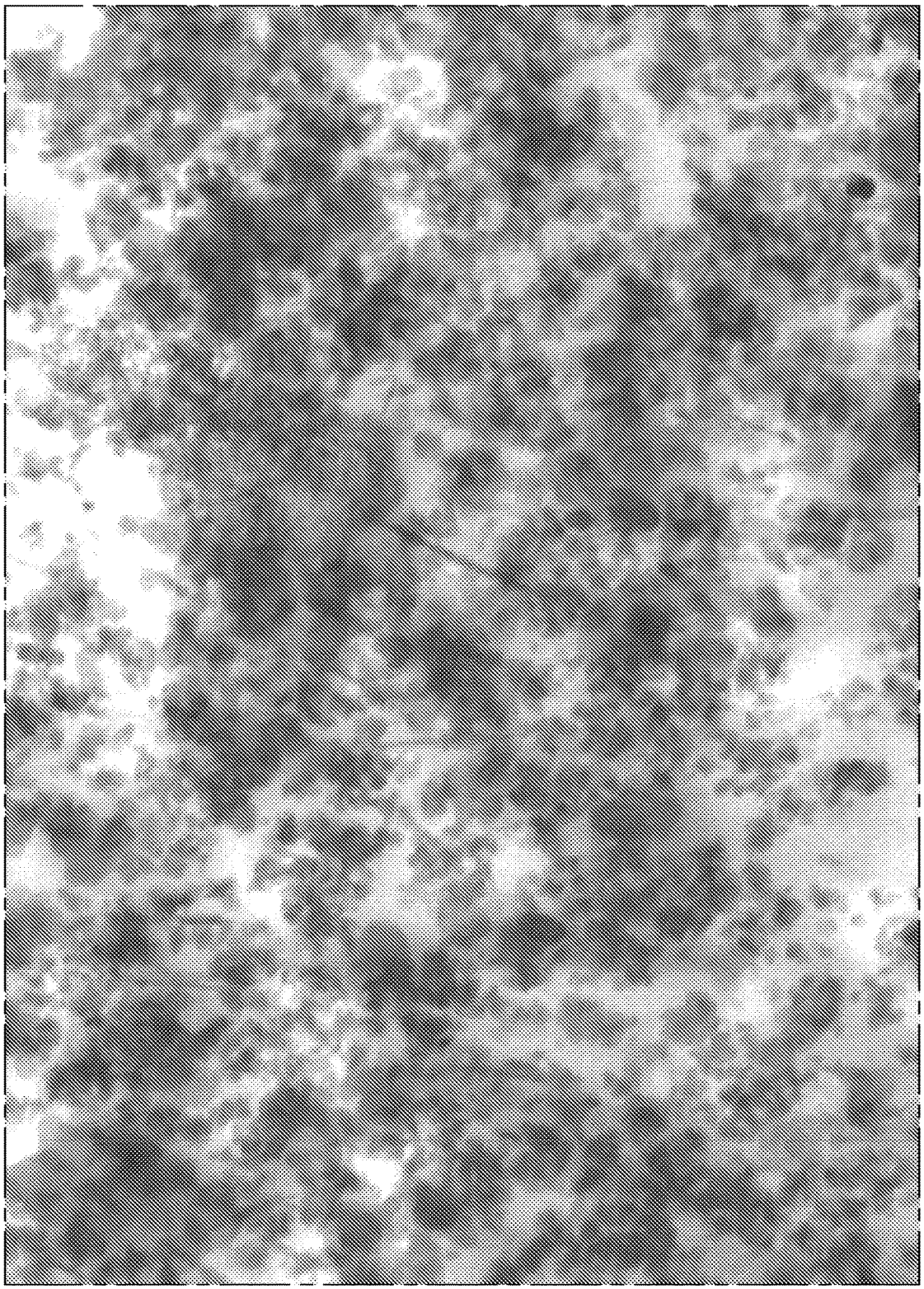
FIG. 14 is the STEM image of a thin section of a vulcanised elastomeric composition (V-MI Example 15), comprising the modified sepiolite fibres F5 according to the comparative example 5.

The comparative samples V-MJ and V-MI were observed at the microscope at 100000 power magnification (STEM characterisation—Scanning Transmission Electron Microscopy—on ultramicrotome thin sections (50 nm) under cold conditions, −120° C.). As can be observed from the images of FIGS. 13 and 14, the modified sepiolite fibres incorporated in the elastomeric matrix are clearly visible, and it is evident that they have an aspect ratio considerably higher than three.

The following Table 8b reports the values measured for the comparative vulcanised samples V-ME2, V-MF2 and those according to the invention V-MQ and V-MR:

TABLE 8b

| | example 15 | | | |
| --- | --- | --- | --- | --- |
| | V-ME2 Comp. | V-MF2 Comp. | V-MQ Inv. | V-MR Inv. |
| Filler | Silica | Silica + sepiolite | Silica + mod. sepiolite Ex. 8 | Silica + mod. sepiolite Ex. 9 |
| % Mg extracted | — | — | 33% | 35% |
| Ca1 [MPa] | 4.00 | 4.47 | 5.03 | 4.92 |

TABLE 8b-continued

| | example 15 | | | |
| --- | --- | --- | --- | --- |
| | V-ME2 Comp. | V-MF2 Comp. | V-MQ Inv. | V-MR Inv. |
| CR [MPa] | 9.72 | 12.32 | 9.66 | 10.45 |
| AR [%] | 213.7 | 261.60 | 184.6 | 195.6 |
| IRHD 23° C. | 74.7 | 74.9 | 75.1 | 74.9 |
| IRHD 100° C. | 73.2 | 73.9 | 74.1 | 73.7 |
| Delta IRHD | 1.5 | 1.0 | 1.0 | 1.2 |
| E' [MPa] 23° C. 100 Hz | 8.68 | 8.90 | 9.22 | 9.53 |
| E' [MPa] 70° C. 100 Hz | 8.69 | 8.68 | 9.23 | 9.63 |
| Tan Delta 23° C. 100 Hz | 0.108 | 0.12 | 0.107 | 0.095 |
| Tan Delta 70° C. 100 Hz | 0.079 | 0.08 | 0.077 | 0.067 |

As can be observed from the data reported in Table 8b, the materials according to the invention V-MQ and V-MR have improved dynamo-mechanical characteristics with respect to the comparative materials in terms of balance between dynamic modulus E' and hysteresis (Tan delta).

In particular, the materials according to the invention show greater dynamic modulus E', considered advantageous in the run-flat function, when the tyre travels deflated. This property makes the present materials particularly interesting in the use as filler of the sidewall of run-flat tyres.

In addition, as is clear from the values of hardness difference measured with IRHD method between 23° C. and 100° C., the thermal stability of the samples according to the invention is improved. The samples V-MQ and V-MR according to the invention have an advantageous balance between hardness and hardness delta associated with an optimal modulus vs. hysteresis ratio. It can be observed that neither the comparative sample V-ME2 nor the comparative sample V-MF2 have the advantageous combination of all these properties (balance of hardness versus hardness delta together with high moduli versus low hystereses).

Example 16 (Elastomeric Materials for Tread Applications)

The elastomeric comparative materials (ML1), (ML2), (MM), (MN) and according to the invention (MS) and (MT), prepared in example 12 and vulcanised at 170° C. for 10 minutes, were subjected to measurement of the static and dynamic mechanical properties according to the previously described methods.

The Table 9a reports the values measured for the three comparative samples:

TABLE 9a

| | (Tread 1) | | |
| --- | --- | --- | --- |
| | Example 16 | | |
| | V-ML1 Comp. | V-MM Comp. | V-MN Comp. |
| Filler | Silica | Silica + sepiolite | Silica + modified sepiolite Ex. 4 |
| % Mg extracted | — | — | 35% |
| CA 0.5 [MPa] | 1.49 | 1.50 | 1.46 |
| CA 1 [MPa] | 2.46 | 2.69 | 2.62 |
| CA 3 [MPa] | 9.88 | 9.88 | 10.64 |
| CR [MPa] | 14.68 | 15.24 | 15.32 |
| AR % | 436.1 | 463.9 | 441.2 |
| IRHD 23° C. | 77.6 | 74.9 | 72.7 |
| IRHD 100° C. | 70.8 | 69.5 | 68.2 |
| delta IRHD | 6.8 | 5.4 | 4.5 |
| E' [MPa] 0° C. 100 Hz | 15.11 | 14.39 | 13.95 |

TABLE 9a-continued (Tread 1)

| | Example 16 | | |
|---|---|---|---|
| | V-ML1 Comp. | V-MM Comp. | V-MN Comp. |
| E' [MPa] 23° C. 100 Hz | 10.57 | 9.88 | 9.72 |
| E' [MPa] 70° C. 100 Hz | 7.70 | 7.30 | 7.17 |
| Tan Delta 0° C. 100 Hz | 0.501 | 0.519 | 0.504 |
| Tan Delta 23° C. 100 Hz | 0.296 | 0.298 | 0.281 |
| Tan Delta 70° C. 100 Hz | 0.152 | 0.145 | 0.141 |
| dG'(0.5-10) MPa | 2.7 | 2.2 | 1.9 |

From the analysis of the data reported in Table 9a, it is inferred that by incorporating the sepiolite fibres modified according to a comparative acid treatment (V-MN) in the elastomeric material, in a quantity even lower than the removed silica (10 phr of silica were substituted with 9.79 phr of modified fibres as in example 12, equal to 7 phr of inorganic residue at 800° C.), one observes a reinforcement capacity comparable to or even greater than that of the silica and of the non-modified sepiolite, as well as good tensile properties. With the elastomeric comparative material (V-MN), one also observes an improved thermoplasticity (delta IRHD), but above all the dissipative properties are drastically improved, measured as Tan Delta at 70° C. The Payne effect also greatly improves.

The following Table 9b reports the values measured for the comparative sample (V-ML2) and for that of the invention (V-MS) and (V-MT):

TABLE 9b (Tread 2)

| | Example 16 | | |
|---|---|---|---|
| | V-ML2 Comp. | V-MS Inv. | V-MT Inv. |
| Filler | Silica | Silica + modified sepiolite Ex. 8 | Silica + modified sepiolite Ex. 9 |
| % Mg extracted | — | 33% | 35% |
| CA 0.5 [MPa] | | | |
| CA 1 [MPa] | 2.92 | 4.15 | 3.82 |
| CA 3 [MPa] | | | |
| CR [MPa] | 13.09 | 12.09 | 13.11 |
| AR % | 366.2 | 287.2 | 333.4 |
| IRHD 23° C. | 74.0 | 73.3 | 70.7 |
| IRHD 100° C. | 69.1 | 68.5 | 67.1 |
| Delta IRHD | 5.1 | 4.8 | 3.6 |
| E' [MPa] 23° C. 100 Hz | 8.68 | 9.13 | 8.77 |
| E' [MPa] 70° C. 100 Hz | 6.51 | 7.08 | 6.88 |
| E' [MPa] 100° C. 100 Hz | 6.22 | 6.89 | 6.81 |
| Delta E' (23-100° C.) [MPa] | 2.46 | 2.24 | 1.96 |
| Tan Delta 23° C. 100 Hz | 0.275 | 0.240 | 0.218 |
| Tan Delta 70° C. 100 Hz | 0.128 | 0.113 | 0.098 |
| Tan Delta 100° C. 100 Hz | 0.071 | 0.063 | 0.051 |

The materials according to the invention V-MS and V-MT have improved dynamo-mechanical characteristics with respect to the reference material V-ML2 in terms of balance between dynamic modulus and hysteresis.

In particular, in the sample of the invention V-MS, it is observed that the modulus increases and the hysteresis decreases, while in the sample of the invention V-MT—which differs from the preceding due to the starting sepiolite fibres that are organically modified (Pangel B5)—one observes the maintenance of the value of the modulus associated however with a drastic reduction of the hysteresis.

In addition, as is clear from the values of hardness difference measured with IRHD method between 23° C. and 100° C., the thermal stability of the samples according to the invention is improved.

The tendency to exhibit a lower dependency of the mechanical properties on the temperature is also demonstrated by the smaller variation observed in the dynamic modules between 23° C. and 100° C., which passes from 2.46 MPa for the comparative composition V-ML2 to 2.24 MPa for the composition according to the invention V-MS in order to reach 1.96 in the case of the composition according to the invention V-MT.

A lower dependence of the dynamic modulus on the temperature is an indication of stability of the performance in high difficulty conditions, such as driving at the adherence limit or emergency manoeuvres such as breaking, conditions in which the tread generally reaches very high temperatures.

Example 17 (Standard 2 Elastomeric Materials)

The elastomeric comparative materials (MO) comprising non-modified sepiolite fibres F-SE and (MP) comprising sepiolite fibres F5 from which 26% of magnesium was extracted, prepared in example 13 and vulcanised at 170° C. for 10 minutes, were subjected to measurement of the dynamic mechanical properties according to the previously described methods.

Figure 12B:
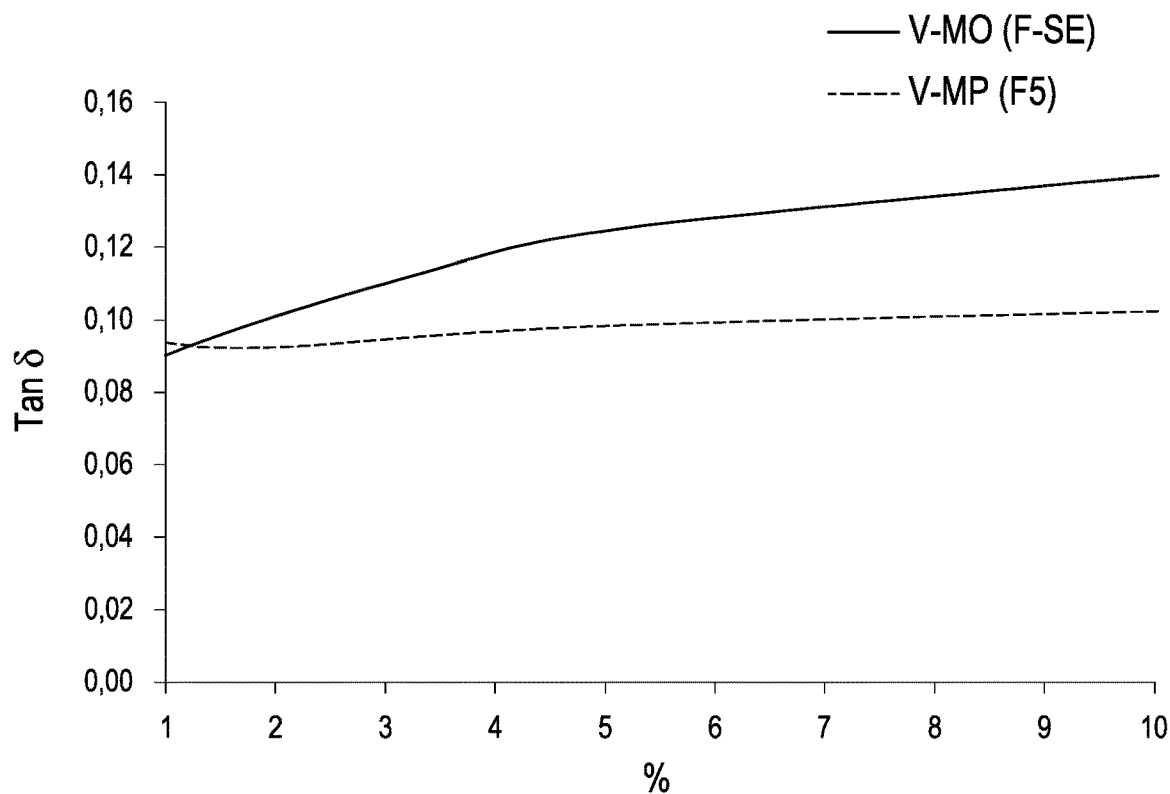

From the mechanical dynamic analysis RPA, the reinforcing effect imparted by the non-modified sepiolite fibres (sample V-MO) and the sepiolite fibres modified according to comparative processes (sample V-MP) on the vulcanised materials was evaluated, as reported in FIGS. 12A and 12B.

In FIG. 12A, it is shown that the variation of the modulus G' with the variation of the deformation of the comparative sample V-MP was quite limited with respect to that of the comparative sample V-MO, indicating a greater stability of the material with respect to the deformation and hence a limited Payne effect.

FIG. 12B illustrates the progression of the hysteresis for the two comparative materials: as can be observed, the sample V-MP has tan delta values significantly lower and more constant than those of the sample V-MO comprising non-modified sepiolite fibres. The data is particularly significant considering that no coupling agent was added to the sample V-MP during mixing step.

In conclusion, from the mechanical analyses conducted on the samples of the elastomeric materials according to the invention and comparatives, it is inferred that the presence of modified fibres according to the controlled acid treatment described herein clearly reduces the hysteresis of the elastomeric materials, simultaneously maintaining a good reinforcement.

Such mechanical properties render the elastomeric materials according to the invention particularly suitable for producing tyres with high reinforcement and simultaneously limited rolling resistance.

The process of the invention has proven particularly advantageous, especially when applied at the industrial level, since it allows the use of conventional apparatuses and plants made of steel, it can be carried out simply in water, with limited quantities of acid and hence without final neutralisation steps. In addition, the extraction of the magnesium in such conditions is gradual, hence the process does not require the strict control of the times, of the solvents and a continuous monitoring of the extraction level of the magnesium, so as to terminate the reaction in order to prevent the excessive removal of the magnesium, as occurred for the known processes.

The invention claimed is:

1. A process for modifying silicate fibres with needle-shaped morphology of nanometric size comprising:
providing silicate fibres with needle-shaped morphology of nanometric size comprising magnesium,
suspending the silicate fibres in a suitable liquid medium to generate a suspension,
adding, to the suspension, at least one acid compound, and bringing the medium to a pH ranging from 2 to 4,
maintaining the medium at the pH range from 2 to 4, by further adding the at least one acid compound, to extract from 10% to 70% by weight of magnesium from the silicate fibres to generate modified silicate fibres, wherein the modified silicate fibres are substantially preserved with a crystalline structure and needle-shaped morphology, and
separating the modified silicate fibres from the liquid medium, wherein the modified silicate fibres with needle-shaped morphology of nanometric size comprise 9.5% to 12% of magnesium.

2. The process as claimed in claim 1, wherein the silicate fibres are sepiolite fibres.

3. The process as claimed in claim 1, wherein the liquid medium is chosen from water, alcohols, ethers, ketones, and mixtures thereof.

4. The process as claimed in claim 1, further comprising maintaining the medium at a pH range from 2.5 to 3.5.

5. The process as claimed in claim 1, wherein adding the at least one acid compound to the medium results in a concentration of the at least one acid compound not higher than 0.01N.

6. The process as claimed in claim 1, further comprising adding a silanising agent to the suspension.

7. The process as claimed in claim 6, wherein the silanising agent is chosen from bis-(triethoxysilylpropyl)disulphide (TESPD), bis[3-(triethoxysilyl)propyl]tetrasulphide (TESPT), 3-thio-octanoyl-1-propyltriethoxysilane (NXT), $Me_2Si(OEt)_2$, $Me_2PhSiCl$, and $Ph_2SiCl_2$.

8. The process as claimed in claim 1, wherein extracting continues to not more than 65%, by weight of magnesium from the silicate fibres.

9. The process as claimed in claim 4, further comprising maintaining the medium at a pH range from 2.8 to 3.2.

10. The process as claimed in claim 5, wherein adding the at least one acid compound to the medium results in a concentration of the at least one acid compound not higher than 0.005N.

* * * * *